US012701109B2

(12) United States Patent
Farley et al.

(10) Patent No.: US 12,701,109 B2
(45) Date of Patent: Aug. 4, 2026

(54) RESOURCE/CONTROL PLANE/LCS AUTHENTICATION SYSTEM

(71) Applicant: Dell Products L.P., Round Rock, TX (US)

(72) Inventors: Douglas Lang Farley, Round Rock, TX (US); Srinivas Giri Raju Gowda, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 18/773,802

(22) Filed: Jul. 16, 2024

(65) Prior Publication Data

US 2026/0025371 A1     Jan. 22, 2026

(51) Int. Cl.
*H04L 9/40*          (2022.01)

(52) U.S. Cl.
CPC .................................... *H04L 63/08* (2013.01)

(58) Field of Classification Search
CPC ...................................................... H04L 63/08
See application file for complete search history.

(56) References Cited

U.S. PATENT DOCUMENTS 10,579,405 B1 * 3/2020 Potlapally ........... G06F 9/45533
10,666,643 B2   5/2020 Mathew et al.

2009/0327741 A1 * 12/2009 Zimmer ................ G06F 21/575
                                                713/2
2019/0089698 A1 * 3/2019 Mathew .............. H04L 63/0838
2023/0014894 A1 * 1/2023 M M ..................... H04L 9/0852
2023/0033667 A1 * 2/2023 Koteshwara .......... G06F 9/4411
2023/0106828 A1 * 4/2023 Butcher .............. G06F 13/4068
                                                710/305

* cited by examiner

*Primary Examiner* — Javier O Guzman
(74) *Attorney, Agent, or Firm* — Joseph Mencher

(57) ABSTRACT

A resource/control plane/LCS authentication system includes a resource system coupled to a resource management system. The resource system includes an SCP device that authenticates with the resource management system to provide an authenticated LCS control plane. An operating system in the resource system signs operating system authentication information and transmits the signed operating system authentication information to the resource management system to provide an authenticated resource system. The operating system creates an LCS vTPM for an LCS that was composed by the resource management system, and stores an LCS vTPM payload from the resource management system in the LCS vTPM. The operating system then provides the LCS using the LCS vTPM payload, with the LCS authenticating itself and the operating system to provide an authenticated LCS. The operating system then performs a workload using the authenticated LCS, the authenticated resource system, and the authenticated LCS control plane.

20 Claims, 23 Drawing Sheets

200

LCS PROVISIONING SUBSYSTEM 206a

LCS PROVISIONING SUBSYSTEM 206b

LCS PROVISIONING SUBSYSTEM 206c

NETWORK 204

CLIENT DEVICE(S) 202

302

RESOURCE
MANAGEMENT
SYSTEM
304

RESOURCE
SYSTEM
306a

RESOURCE
SYSTEM
306b

RESOURCE
SYSTEM
306c

LCS PROVISIONING SUBSYSTEM 300

402

RESOURCE SYSTEM 400

SCP
DEVICE
406

RESOURCE
DEVICE
404a

RESOURCE
DEVICE
404b

RESOURCE
DEVICE
404c

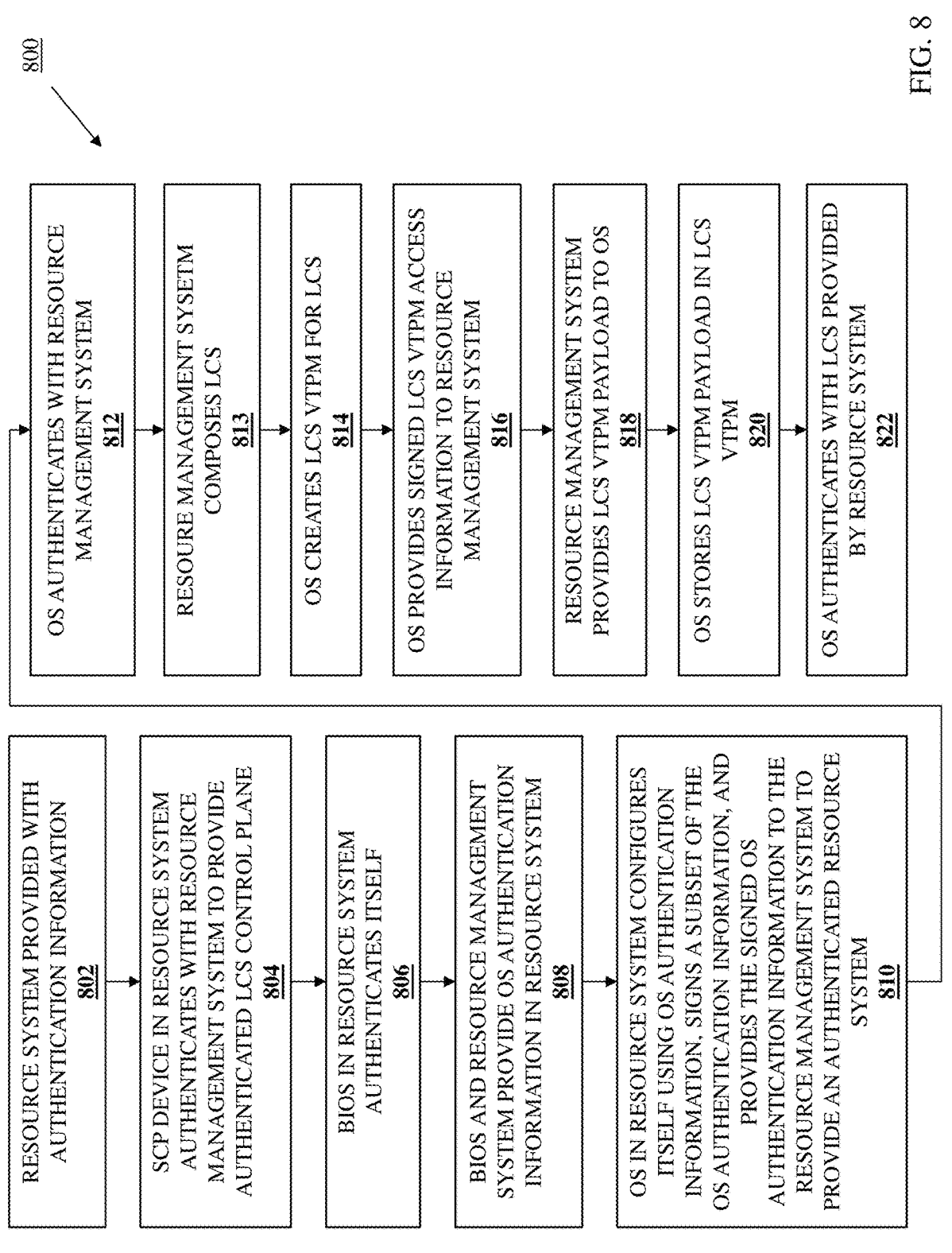

RESOURCE SYSTEM PROVIDED WITH AUTHENTICATION INFORMATION
802

SCP DEVICE IN RESOURCE SYSTEM AUTHENTICATES WITH RESOURCE MANAGEMENT SYSTEM TO PROVIDE AUTHENTICATED LCS CONTROL PLANE
804

BIOS IN RESOURCE SYSTEM AUTHENTICATES ITSELF
806

BIOS AND RESOURCE MANAGEMENT SYSTEM PROVIDE OS AUTHENTICATION INFORMATION IN RESOURCE SYSTEM
808

OS IN RESOURCE SYSTEM CONFIGURES ITSELF USING OS AUTHENTICATION INFORMATION, SIGNS A SUBSET OF THE OS AUTHENTICATION INFORMATION, AND PROVIDES THE SIGNED OS AUTHENTICATION INFORMATION TO THE RESOURCE MANAGEMENT SYSTEM TO PROVIDE AN AUTHENTICATED RESOURCE SYSTEM
810

OS AUTHENTICATES WITH RESOURCE MANAGEMENT SYSTEM
812

RESOURE MANAGEMENT SYSETM COMPOSES LCS
813

OS CREATES LCS VTPM FOR LCS
814

OS PROVIDES SIGNED LCS VTPM ACCESS INFORMATION TO RESOURCE MANAGEMENT SYSTEM
816

RESOURCE MANAGEMENT SYSTEM PROVIDES LCS VTPM PAYLOAD TO OS
818

OS STORES LCS VTPM PAYLOAD IN LCS VTPM
820

OS AUTHENTICATES WITH LCS PROVIDED BY RESOURCE SYSTEM
822

RESOURCE/CONTROL PLANE/LCS AUTHENTICATION SYSTEM

BACKGROUND

The present disclosure relates generally to information handling systems, and more particularly to authenticating resources, a control plane, and a Logically Composed System (LCS) provided by an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices (e.g., "Bare Metal Servers (BMSs)) and/or other computing devices known in the art, may be utilized to provide Logically Composed Systems (LCSs) that perform workloads. For example, a user or administrator may provide a request to perform a workload, a server device may be selected for providing the LCS that is configured to perform that workload, and the resources of that server device may then be subsequently used to provide the LCS that performs that workload. In many cases it would be desirable to authenticate the provisioning of such LCSs, but conventional LCS provisioning systems do not provide any means for authenticating resources for use in providing LCSs, authenticating control planes used with resources to provide LCSs, and authenticating the use of LCSs with control planes and resources to perform the workloads requested by users as described above.

Accordingly, it would be desirable to provide a resource/control plane/LCS authentication system that addresses the issues discussed above.

SUMMARY

According to one embodiment, an Information Handling System (IHS) includes a System Control Processor (SCP) device that is configured to authenticate with a resource management system to provide an authenticated Logically Composed System (LCS) control plane; a Basic Input/Output System (BIOS) that is configured to provide BIOS operating system authentication information in an authentication information database with resource management operating system authentication information provided by the resource management system; and an operating system that is configured to: sign the BIOS operating system authentication information and the resource management operating system authentication information to provide signed operating system authentication information; transmit the signed operating system authentication information to the resource management system to provide an authenticated resource system; create an LCS vTPM for an LCS that was composed by the resource management system; receive an LCS vTPM payload for the LCS from the resource management system and store the LCS vTPM payload in the LCS vTPM; provide the LCS using the LCS vTPM payload, wherein the LCS is configured to authenticate itself and the operating system to provide an authenticated LCS; and perform a workload using the authenticated LCS, the authenticated resource system, and the authenticated LCS control plane.

BRIEF DESCRIPTION OF THE DRAWINGS

FIG. 8 is a flow chart illustrating an embodiment of a method for authenticating a Logically Composed System (LCS) along with the resource system and the LCS control plane that are used to provide that LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
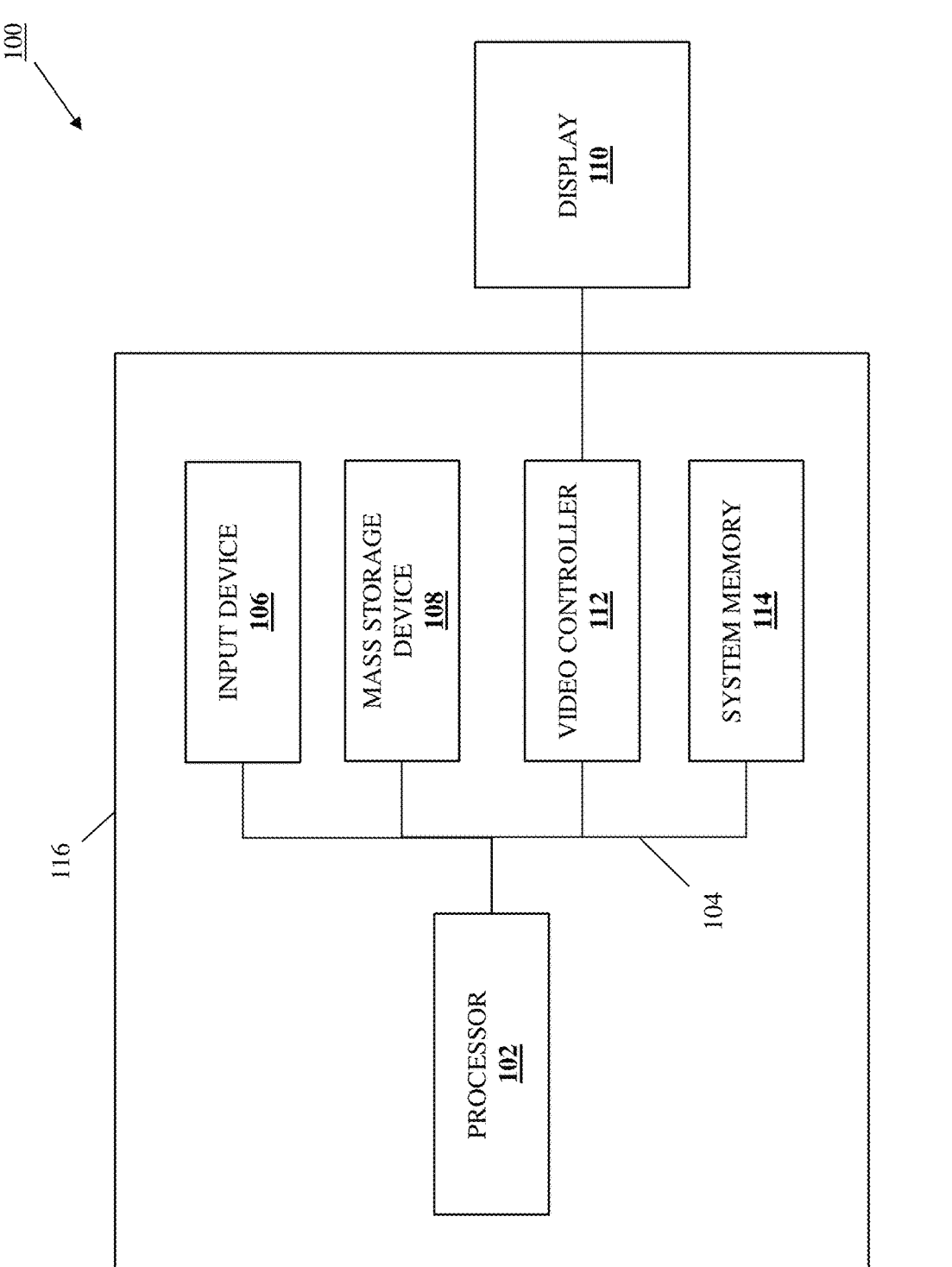
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the resource/control plane/Logically Composed System (LCS) authentication systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
FIG. 2 is a schematic view illustrating an embodiment of an LCS provisioning system.

With reference to FIG. 2, an embodiment of a Logically Composed System (LCS) provisioning system 200 is illustrated that may be utilized with the resource/control plane/ LCS authentication systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
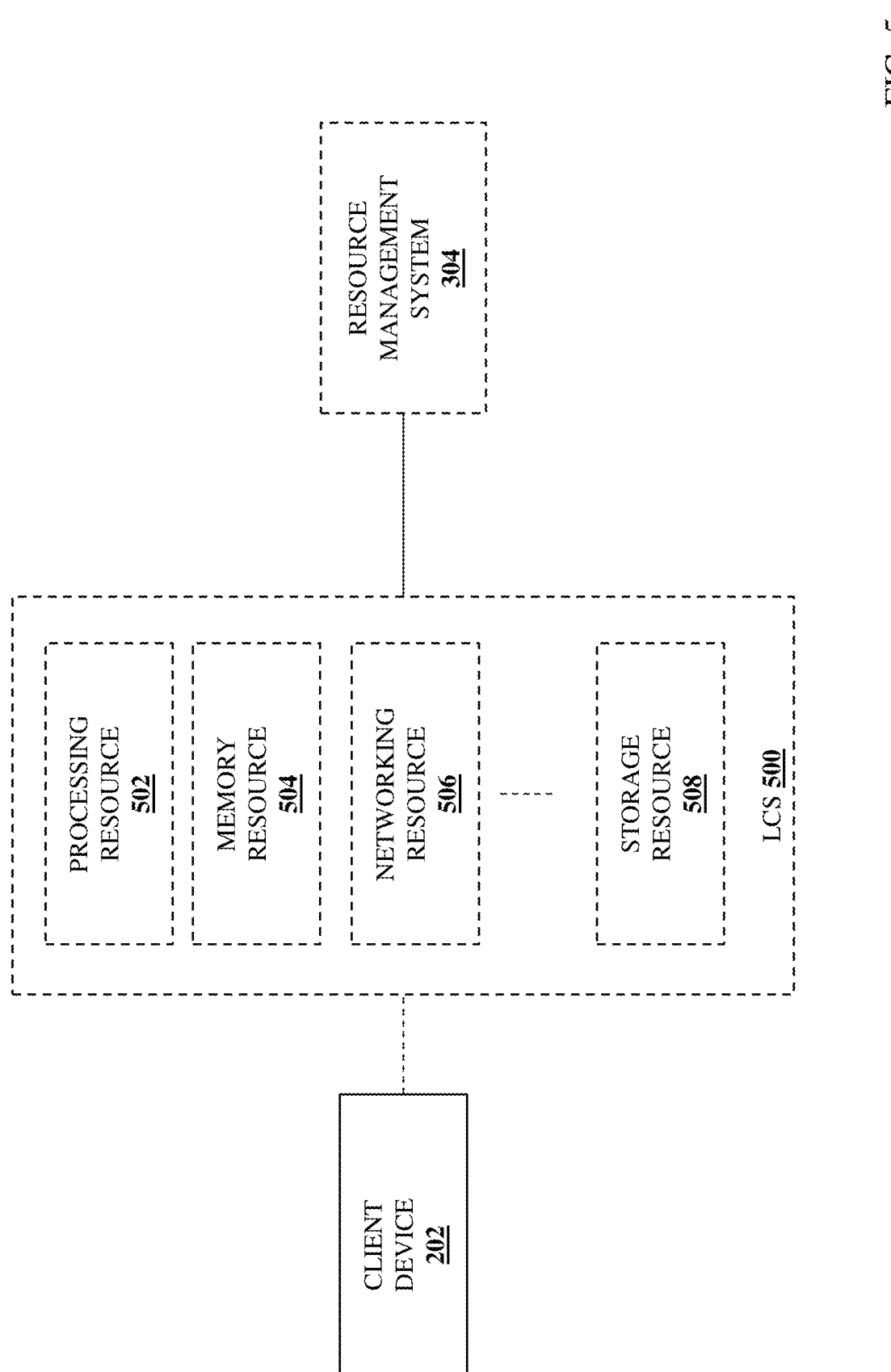
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306*a*-306*c*/400 that allocate any of the resource devices 404*a*-404*c* that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
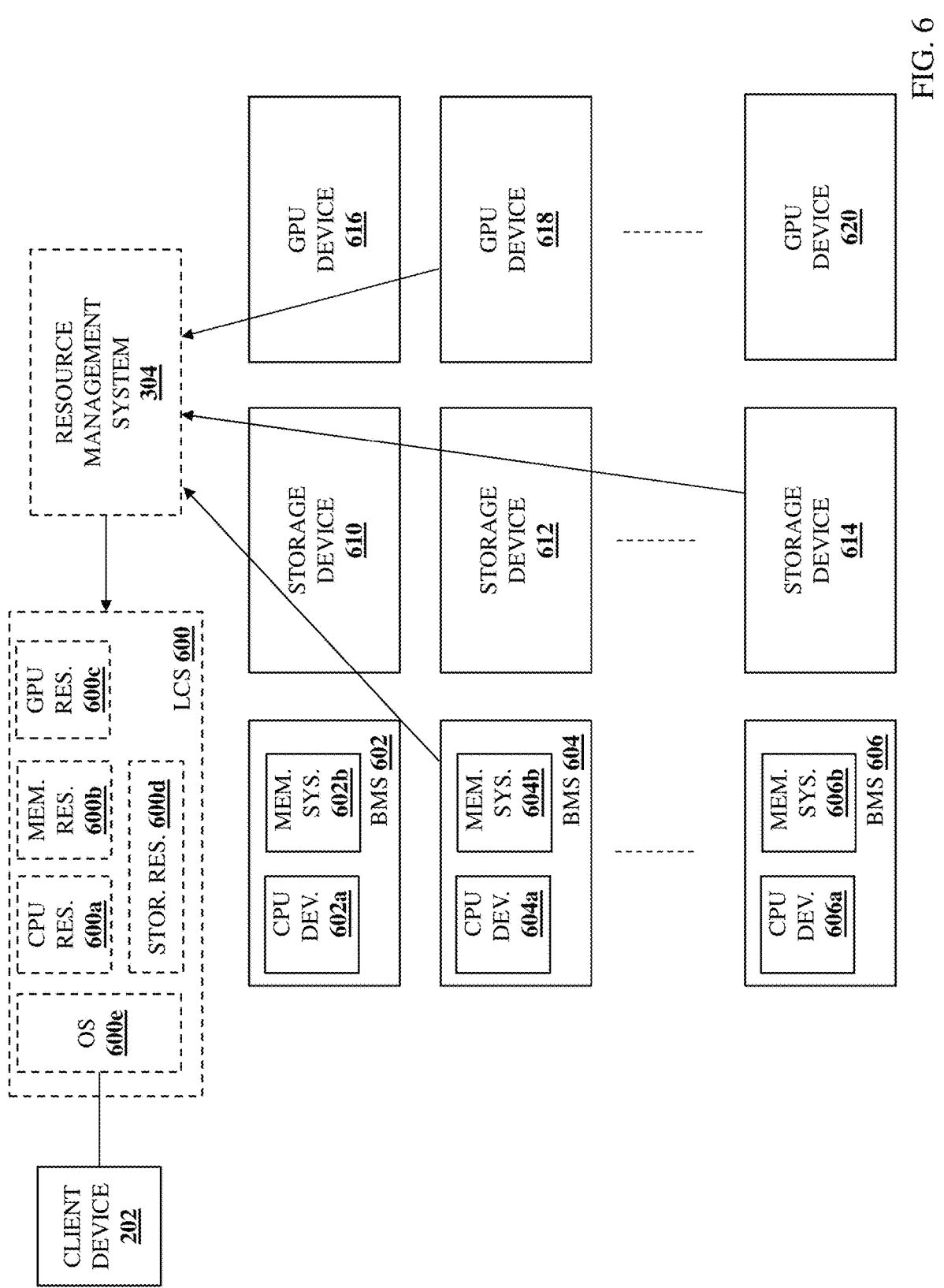
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306*a*-306*c* available to the resource management system 304 include a Bare Metal Server (BMS) 602 having a Central Processing Unit (CPU) device 602*a* and a memory system 602*b*, a BMS 604 having a CPU device 604*a* and a memory system 604*b*, and up to a BMS 606 having a CPU device 606*a* and a memory system 606*b*. Furthermore, one or more of the resource systems 306*a*-306*c* includes resource devices 404*a*-404*c* provided by a storage device 610, a storage device 612, and up to a storage device 614. Further still, one or more of the resource systems 306*a*-306*c* includes resource devices 404*a*-404*c* provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600*a* that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
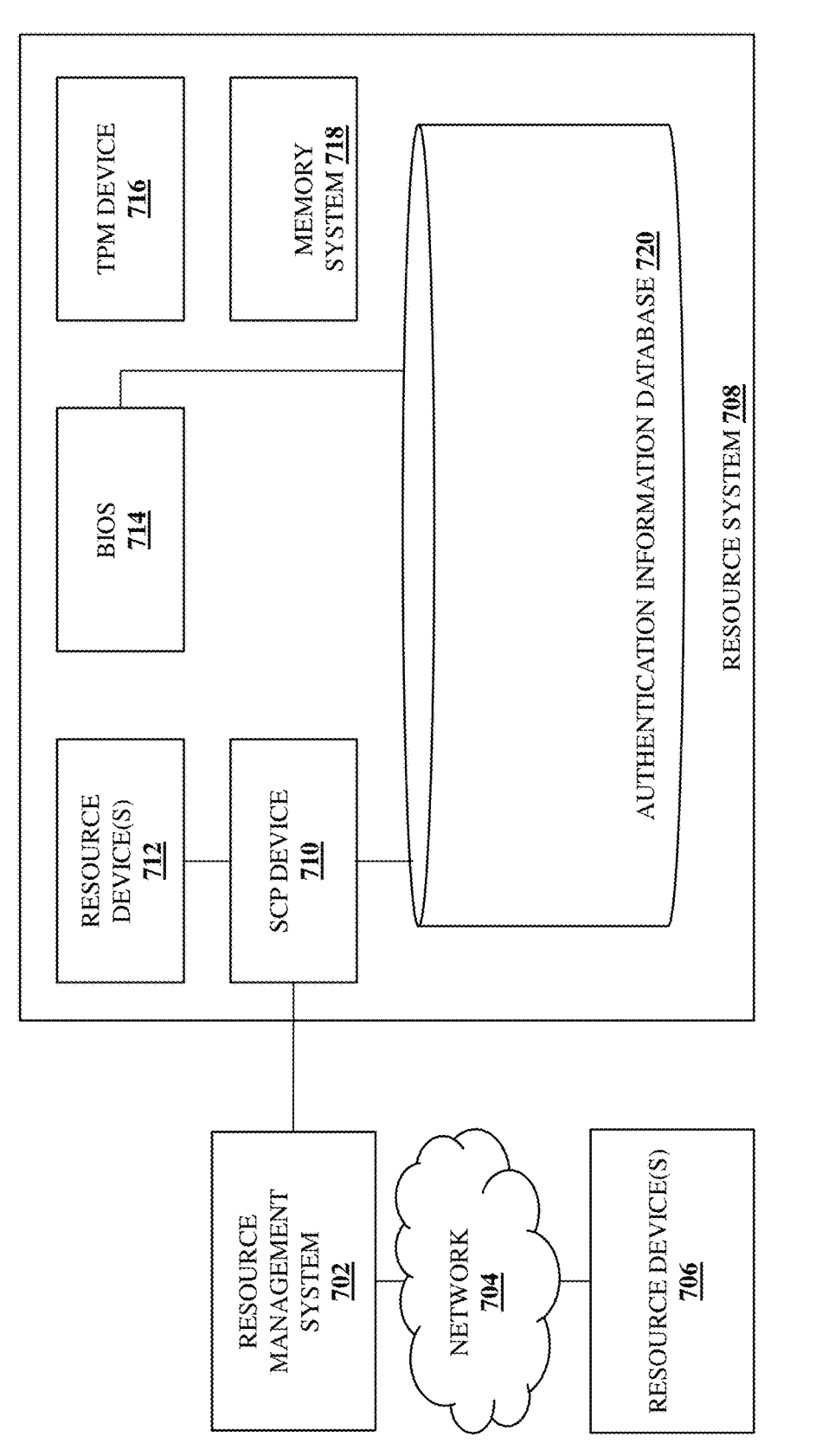
FIG. 7 is a schematic view illustrating an embodiment of an LCS provisioning system that may provide the resource/control plane/LCS authentication system of the present disclosure.

Referring now to FIG. 7, an embodiment of an LCS provisioning system 700 is illustrated that may provide the resource/control plane/LCS authentication system of the present disclosure. In the illustrated embodiment, the LCS provisioning system 700 may be provided using the LCS provisioning system 200 described above with reference to FIG. 2 and the LCS provisioning subsystem described above with reference to FIG. 3, and may operate similarly as described with reference to FIGS. 5 and 6. The LCS provisioning system 700 includes a resource management system 702 that may be provided by the resource management system 304 of FIGS. 3, 5, and/or 6 and, as illustrated, the resource management system 702 may be coupled via a network 704 that may be provided by the network 204 discussed above with reference to FIG. 2. Furthermore, one or more resource devices 706 may be coupled to the resource management system 702 via the network 704, and may be provided by any of the resource devices 404*a*-404*c* of FIG. 4; the CPU device/memory system combinations 602*a*/602*b*, 604*a*/604*b*, and 606*a*/606*b* in the BMSs 602, 604, and 606, respectively, of FIG. 6; the storage devices 610, 612, and 614 of FIG. 6; the GPU devices 616, 618, and 620 of FIG. 6; and/or any other resource devices described above.

The LCS provisioning system 700 also includes a resource system 708 that one of skill in the art in possession of the present disclosure will appreciate is selected and authenticated to provide the authenticated LCS using the authenticated LCS control plane described below. As will be appreciated by one of skill in the art in possession of the present disclosure, the resource system 708 may be provided by any of the resource systems 306*a*, 306*b*, and 306*c* of FIG. 3; the resource system 400 of FIG. 4; the BMSs 602, 604, and 606 of FIG. 6; and/or any other resource systems described above. In the illustrated embodiment, the resource system 708 includes an SCP device 710 that may be provided by the SCP device 406 discussed above with reference to FIG. 4, and/or any other SCP device described above. Furthermore, the resource system 708 may also include one or more resource devices 712 that are coupled to the SCP device 710 and that may be provided by any of the resource devices 404*a*-404*c* of FIG. 4; the CPU device/memory system combinations 602*a*/602*b*, 604*a*/604*b*, and 606*a*/606*b* in the BMSs 602, 604, and 606, respectively, of FIG. 6; the storage devices 610, 612, and 614 of FIG. 6; the GPU devices 616, 618, and 620 of FIG. 6; and/or any other resource devices described above.

In the illustrated embodiment, the resource system 708 also includes a Basic Input/Output System (BIOS) 714 that may include firmware that is configured to perform hardware initialization during an initialization process (e.g., Power-On Start-up (POST)) for the resource system 708, runtime services for operating systems and application provided on the resource system 708, and/or other BIOS functionality known in the art. Furthermore, one of skill in the art in possession of the present disclosure will appreciate how the BIOS 714 may be provided by a Unified Extensible Firmware Interface (UEFI) and/or other initialization subsystems while remaining within the scope of the present disclosure. The resource system 708 also includes a Trusted Platform Module (TPM) device 716 that may provide a secure crypto-processing system having a microcontroller that is configured to secure hardware in the resource system 708 using integrated cryptographic keys, as well as perform any other TPM functionality that would be apparent to one of skill in the art in possession of the present disclosure.

The resource system 708 also includes a memory system 718, and one of skill in the art in possession of the present disclosure will appreciate how the memory system 718 may include any of a variety of memory devices that are configured to provide the virtual TPM (vTPM) functionality described below. The resource system 708 may also include a storage device that is coupled to the SCP device 710 and the BIOS 714 and configured to provide an authentication information database 720 that is configured to store the information utilized by the SCP device 710 and the BIOS 714 as described below. However, while a specific LCS providing system 700 for providing the resource/control plane/LCS authentication system of the present disclosure has been illustrated and described, one of skill in the art in possession of the present disclosure will appreciate how resource/control plane/LCS authentication system of the present disclosure may be provided using a variety of components and/or component configurations while remaining within the scope of the present disclosure as well.

Referring now to FIG. 8, an embodiment of a method 800 for authenticating a Logically Composed System (LCS), along with the resource system and the LCS control plane that are used to provide that LCS, is illustrated. As discussed below, the systems and methods of the present disclosure provide for the authentication of a resource system and the control plane provided for the resource system, as well as between the resource system and any LCS it provides. For example, the resource/control plane/LCS authentication system of the present disclosure may include a resource system coupled to a resource management system. The resource system includes an SCP device that authenticates with the resource management system to provide an authenticated LCS control plane. An operating system in the resource system signs operating system authentication information and transmits the signed operating system authentication information to the resource management system to provide an authenticated resource system. The operating system creates an LCS vTPM for an LCS that was composed by the resource management system, and stores an LCS vTPM payload from the resource management system in the LCS vTPM. The operating system then provides the LCS using the LCS vTPM payload, with the LCS authenticating itself and the operating system to provide an authenticated LCS. The operating system then performs a workload using the authenticated LCS, the authenticated resource system, and the authenticated LCS control plane As such, the provisioning of LCSs may be authenticated both by the system providing that LCS, and by the LCS itself.

Figure 9:
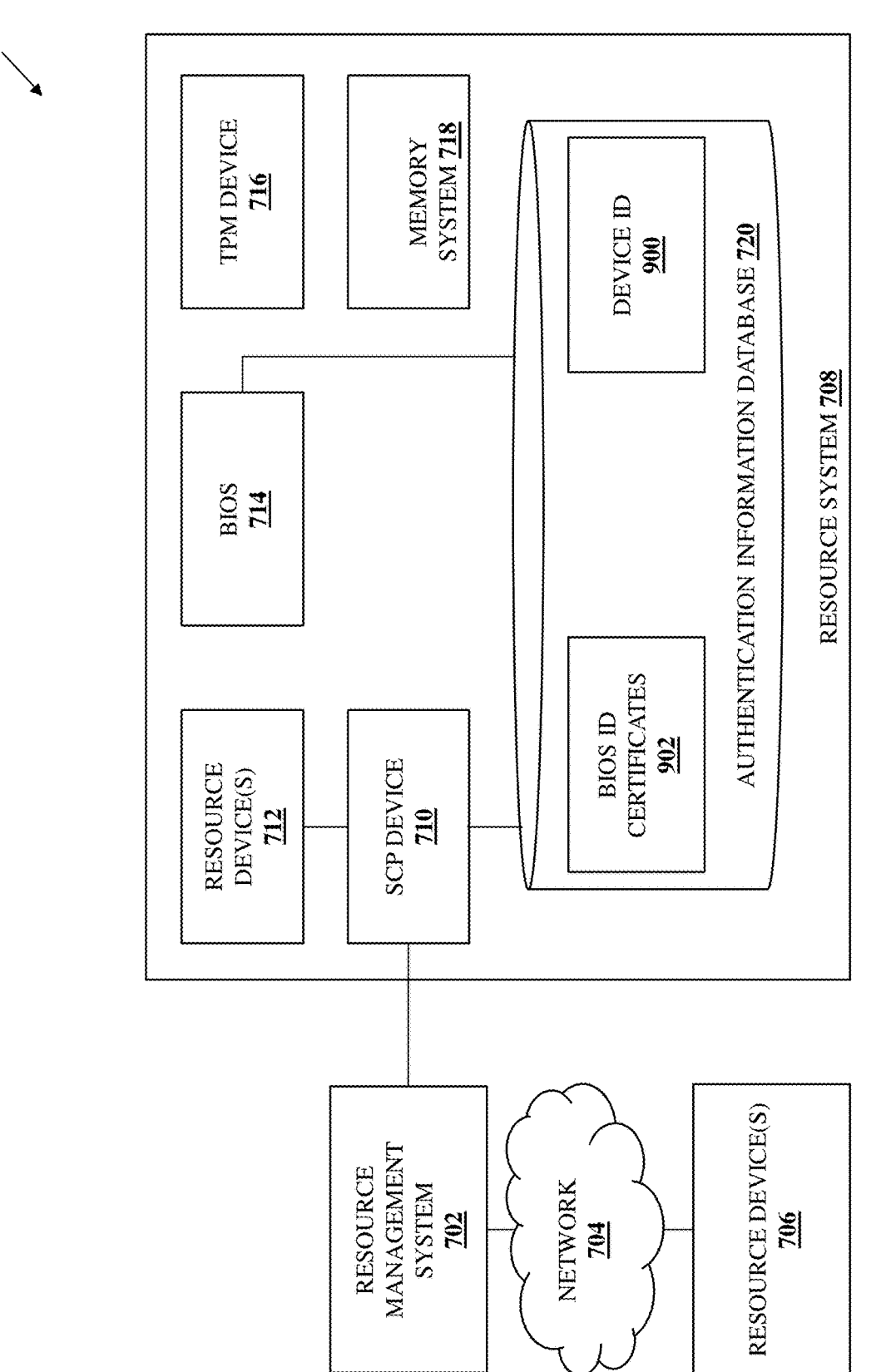
FIG. 9 is a schematic view illustrating an embodiment of the LCS provisioning system of FIG. 7 operating during the method of FIG. 8.

The method 800 begins at block 802 where a resource system is provided with authentication information. With reference to FIG. 9, in an embodiment of block 802, the authentication information database 720 in the resource system 708 of the LCS provisioning system 700 may be provided with authentication information that, in the illustrated embodiment, is provided by device identifier 900 ("DEVICE ID 900") for the resource system 708 that may be used by the BIOS 714 to create the operating system authentication certificates as described below, and BIOS identity certificates 902 ("BIOS ID CERTIFICATES 902") that may be used by the BIOS 714 to verify its authenticity as described below. However, while particular authentication information and particular uses of that authentication information are illustrated and described herein, one of skill in the art in possession of the present disclosure will appreciate how other authentication information and/or uses of the authentication information described herein will fall within the scope of the present disclosure as well.

Figure 10:
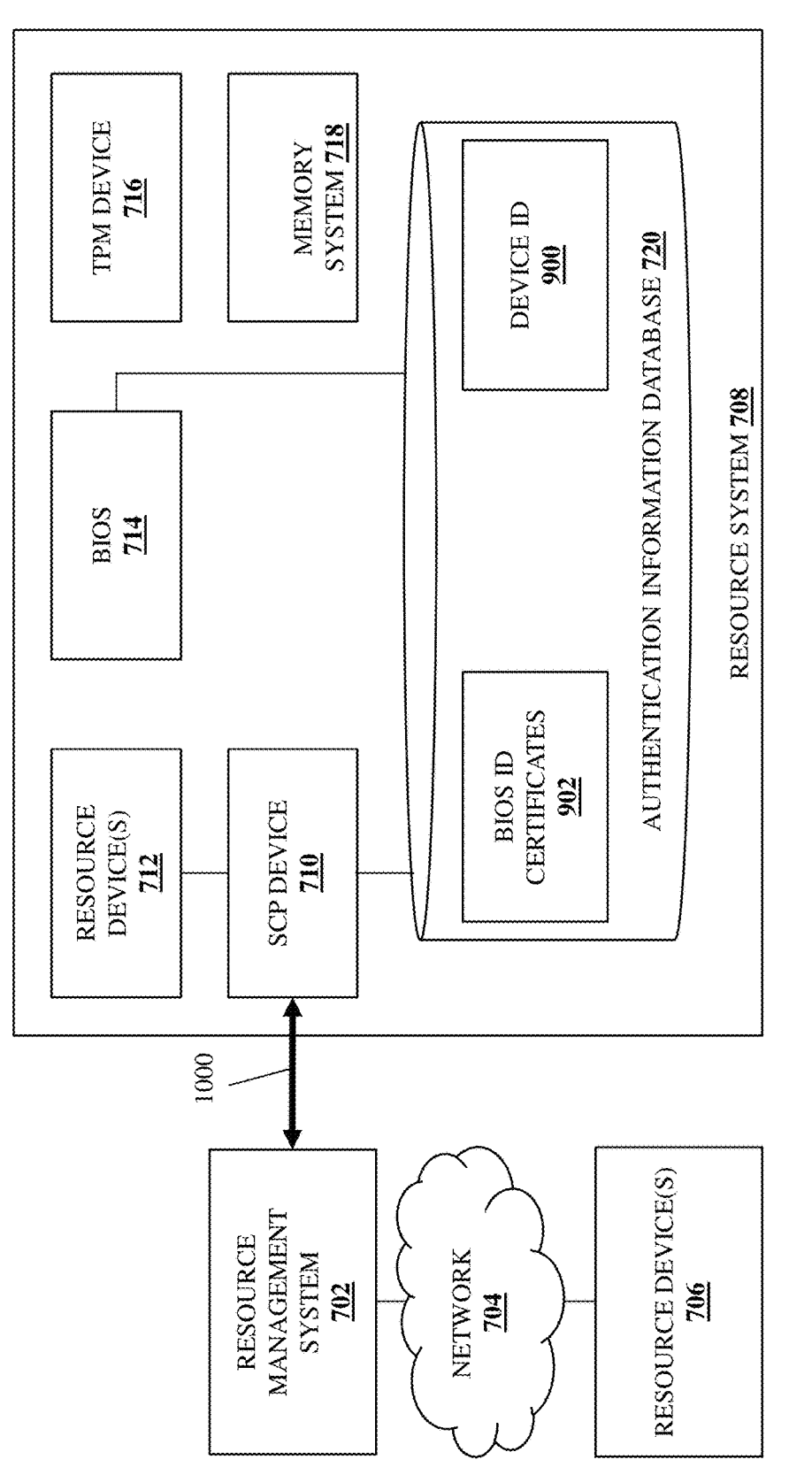
FIG. 10 is a schematic view illustrating an embodiment of the LCS provisioning system of FIG. 7 operating during the method of FIG. 8.

The method 800 then proceeds to block 804 where an SCP device in the resource system authenticates with a resource management system to provide an authenticated LCS control plane. With reference to FIG. 10, in an embodiment of block 804, the SCP device 710 in the resource system 708 and the resource management system 702 may perform authentication operations 1000 that may include, for example, the SCP device 710 using an SCP certificate (e.g., a pre-provisioned SCP identity certificate provided by a manufacturer of the SCP device 710 and/or the resource system 708 prior to the method 800) and the resource management system 702 using a resource management system certificate (e.g., a pre-provisioned resource management system identity certificate provided by a manufacturer of the resource management system 708 prior to the method 800) to perform mutual authentication operations (e.g., using Mutual Transport Layer Security (MTLS) techniques) that one of skill in the art in possession of the present disclosure will appreciate will provide for authentication of an LCS control plane between by the SCP device 710 and the resource management system 702 that will be used to provide an LCS during the method 800 similarly as described above.

Figure 11:
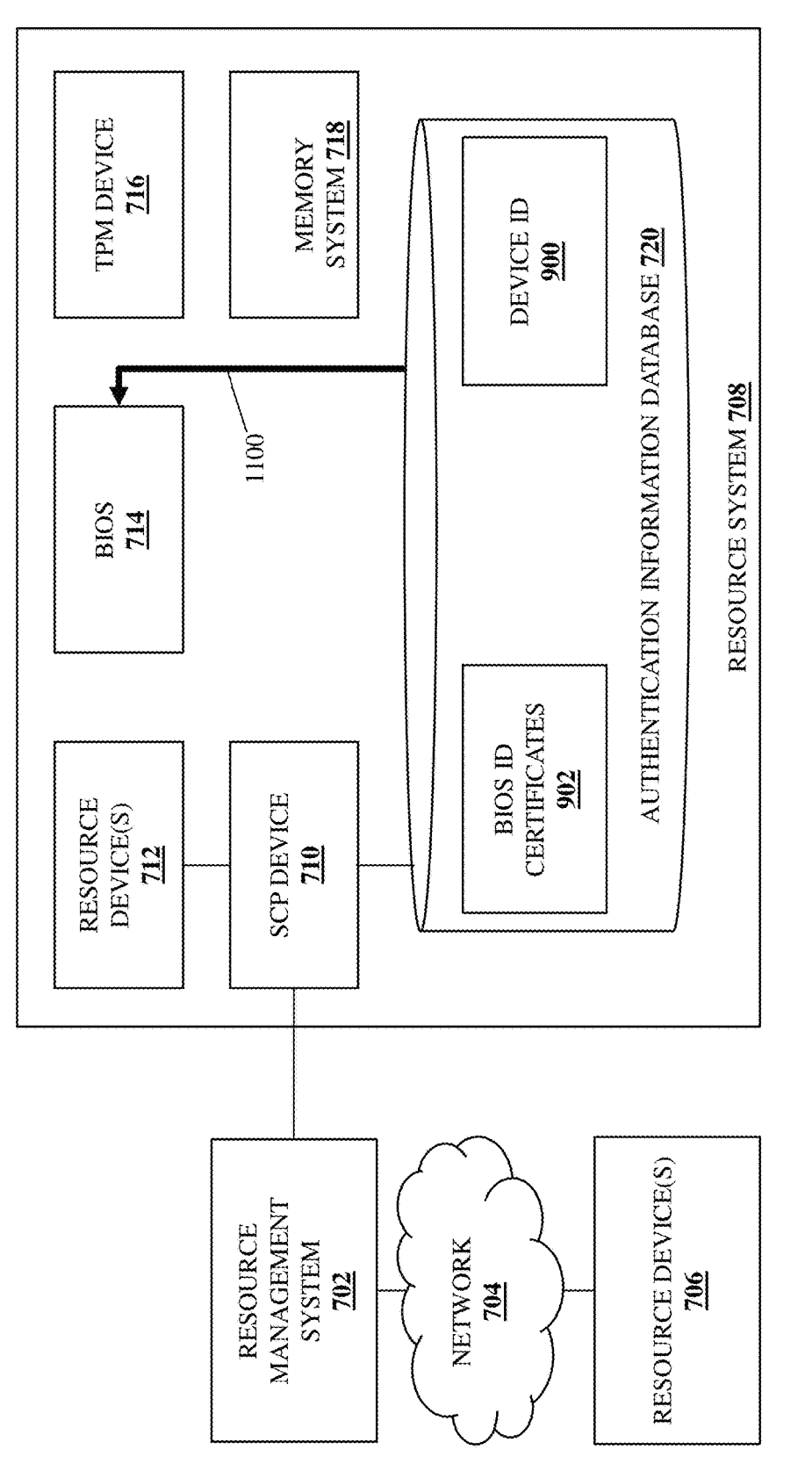
FIG. 11 is a schematic view illustrating an embodiment of the LCS provisioning system of FIG. 7 operating during the method of FIG. 8.

The method 800 then proceeds to block 806 where a BIOS in the resource system authenticates itself. With reference to FIG. 11, in an embodiment of block 806, the BIOS 714 in the resource system 708 may perform BIOS authentication operations 1100 that may include performing any of a variety of BIOS authentication techniques known in the art using the BIOS identity certificates 902 in the authentication information database 720 in order to authenticate the BIOS 714. As such, one of skill in the art in possession of the present disclosure will appreciate how the BIOS 714 may retrieve the BIOS identity certificates 902 from the authentication information database 720 and use those BIOS identity certificates 902 to perform secure boot operations (e.g., by generating hash result(s) using BIOS firmware and comparing the hash result(s) to value(s) in the BIOS identity certificates 902 to verify that they match and thus that authentic BIOS firmware is being used to provide the BIOS 714) that would be apparent to one of skill in the art in possession of the present disclosure.

Figure 12:
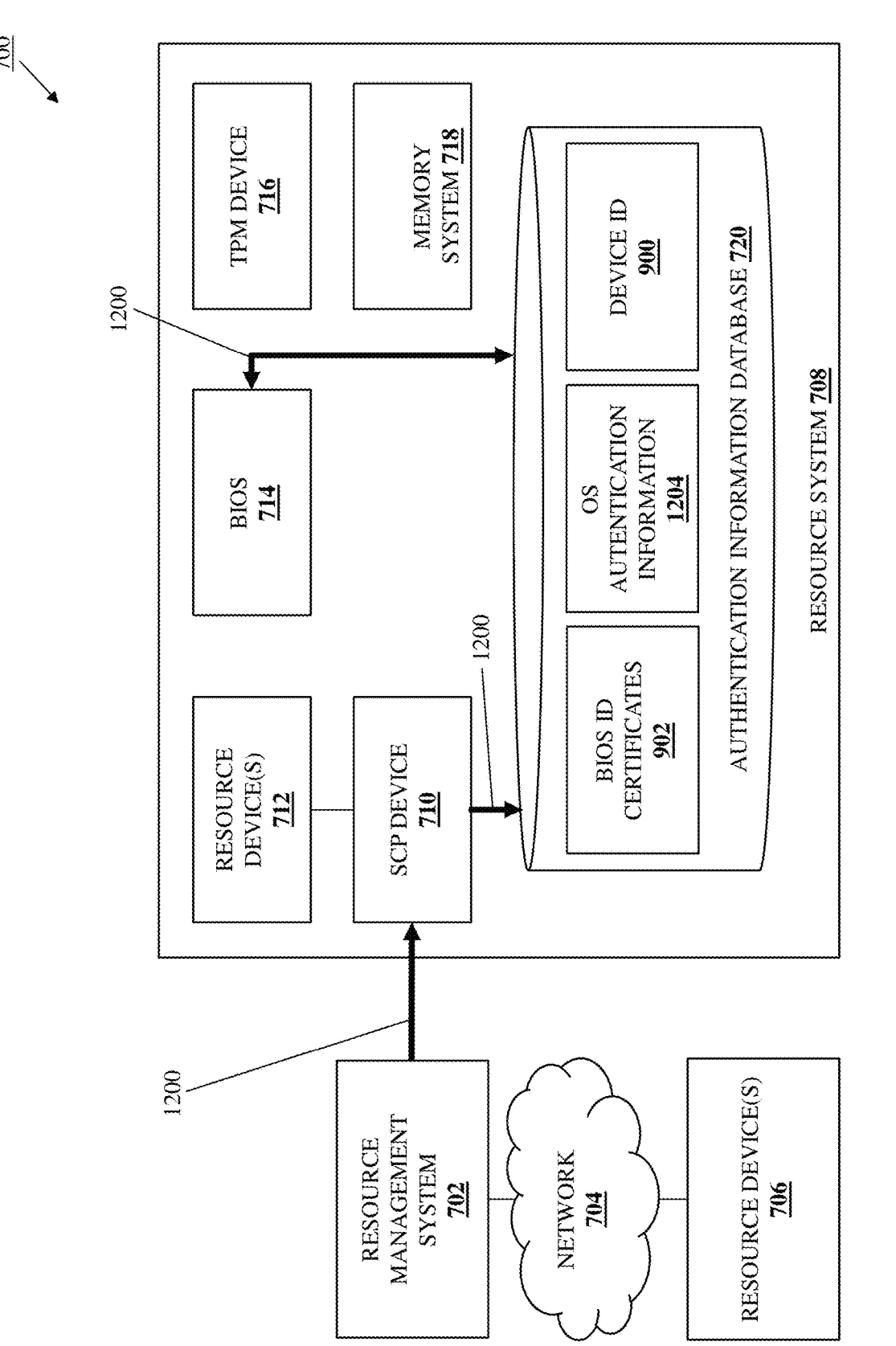
FIG. 12 is a schematic view illustrating an embodiment of the LCS provisioning system of FIG. 7 operating during the method of FIG. 8.

The method 800 then proceeds to block 808 where the BIOS and the resource management system provide operating system authentication information in the resource system. With reference to FIG. 12, in an embodiment of block 808, the BIOS 714 may perform BIOS operating system authentication information provisioning operations 1200 and the resource management system 702 may perform resource management operating system authentication information provisioning operations 1202 (e.g., via the SCP device 710 in the illustrated example) in order to provide operating system authentication information 1204 in the authentication information database 720.

For example, the BIOS operating system authentication information provisioning operations 1200 may include the BIOS 714 using the device ID 900, the BIOS identity certificates 902, and/or any other information in the authentication information database 708 to create a BIOS operating system authentication certificate or other BIOS operating system authentication information that one of skill in the art in possession of the present disclosure will recognize identifies a "chain of trust" for the BIOS 714 (i.e., a "chain" of certificates that enable the BIOS 714 to be trusted), the operating system identity certificates discussed below for an operating system (e.g., a microvisor) that will be provided by the resource system 708 (discussed in further detail below), as well as any other operating system authentication information that one of skill in the art in possession of the present disclosure would appreciate may be provided by a BIOS to enable the functionality discussed below.

Furthermore, the resource management operating system authentication information provisioning operations 1202 may include the resource management system 702 creating a resource management operating system authentication certificate that one of skill in the art in possession of the present disclosure will recognize provides a "chain of trust" for the resource management system 702 (i.e., a "chain" of certificate that enables the resource management system 702 and a resource system cluster (e.g., a group of resource systems that include the resource system 708 and the resource system(s) that provide the resource device(s) 706) governed by the resource management system 702) to be trusted), as well as any other operating system authentication information that one of skill in the art in possession of the present disclosure would appreciate may be provided by a resource management system to enable the functionality discussed below.

As will appreciated by one of skill in the art in possession of the present disclosure, the "chain of trust" provided by each the BIOS operating system authentication certificate and the resource management operating system authentication certificate may include certificates (e.g., X.509 (or other) identity certificates that may have been issued by a known/trusted certificate authority, intermediate certificates derived from that known/trusted certificate authority, etc.) that are configured to be "traced back" to a known/trusted certificate authority (e.g., the manufacturer of the resources system and the manufacturer of the resource management system). As such, as long as the known/trusted certificate authorit(ies) discussed above are trusted by users for which LCSs are provided as described herein, the establishment of trust between the resource management system 702 and the resource system 708 via the mutual authentication discussed below allows the user to trust an LCS provided on the resource system 708 by the resource management system 702.

The method 800 then proceeds to block 810 where an operating system in the resource system configures itself using the operating system authentication information, signs a subset of the operating system authentication information, and provides the signed operating system authentication information to the resource management system to provide an authenticated resource system.

Figure 13A:
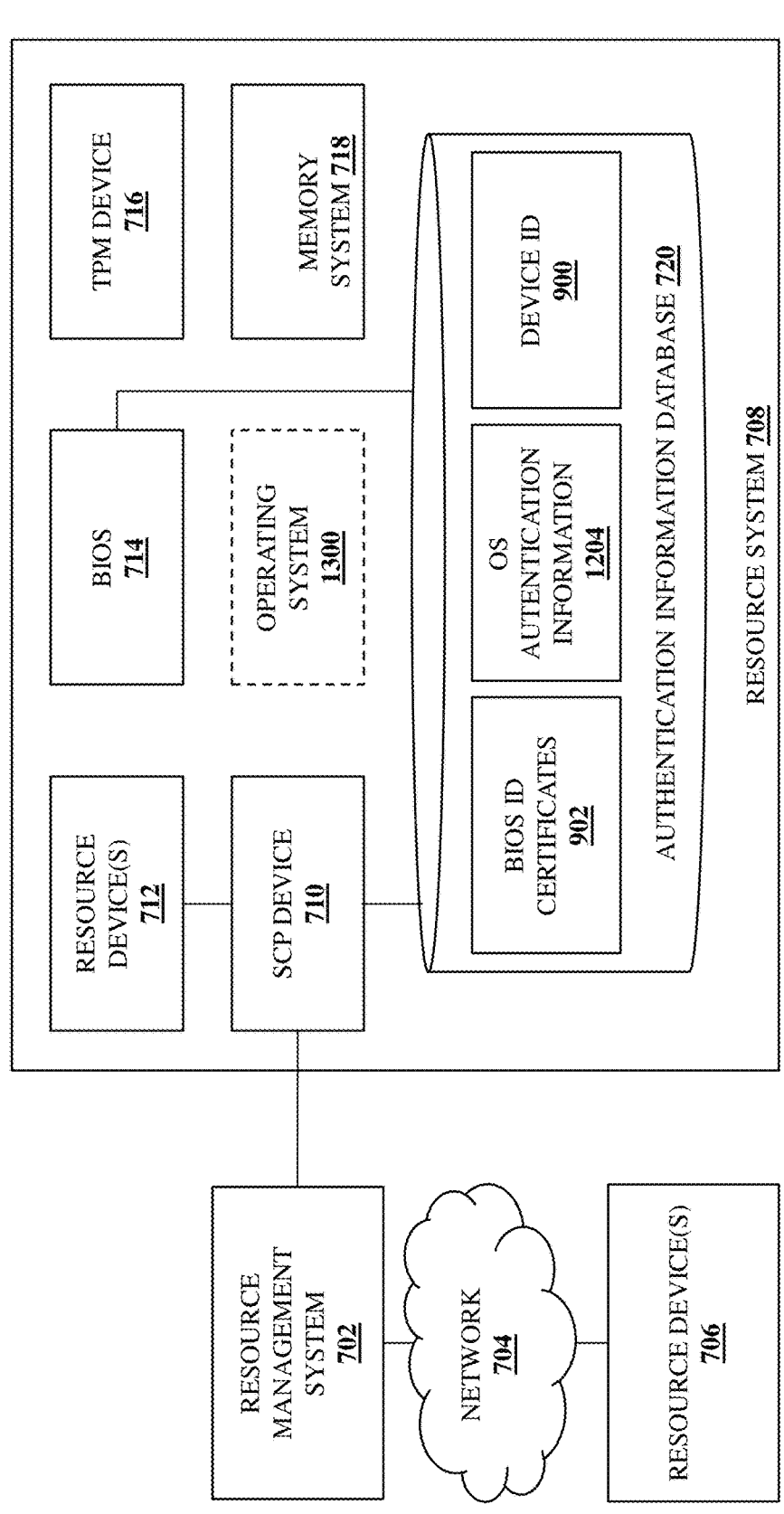
FIG. 13A is a schematic view illustrating an embodiment of the LCS provisioning system of FIG. 7 operating during the method of FIG. 8.

With reference to FIG. 13A, at or prior to block 810, the BIOS 714 may complete initialization operations for the resource system 708 such that an operating system 1300 is loaded or otherwise provided on the resource system 708 (e.g., operating system instructions are provided on a memory subsystem in the resource system 708 that are executable by a processing subsystem on the resource system 708 to cause the processing subsystem to provide the operating system 1300). As will be appreciated by one of skill in the art in possession of the present disclosure, the operating system 1300 illustrated and described below may include a microvisor that operates to provide the LCS discussed below, but other operating systems and/or operating-system-provided entities will fall within the scope of the present disclosure as well.

Figure 13B:
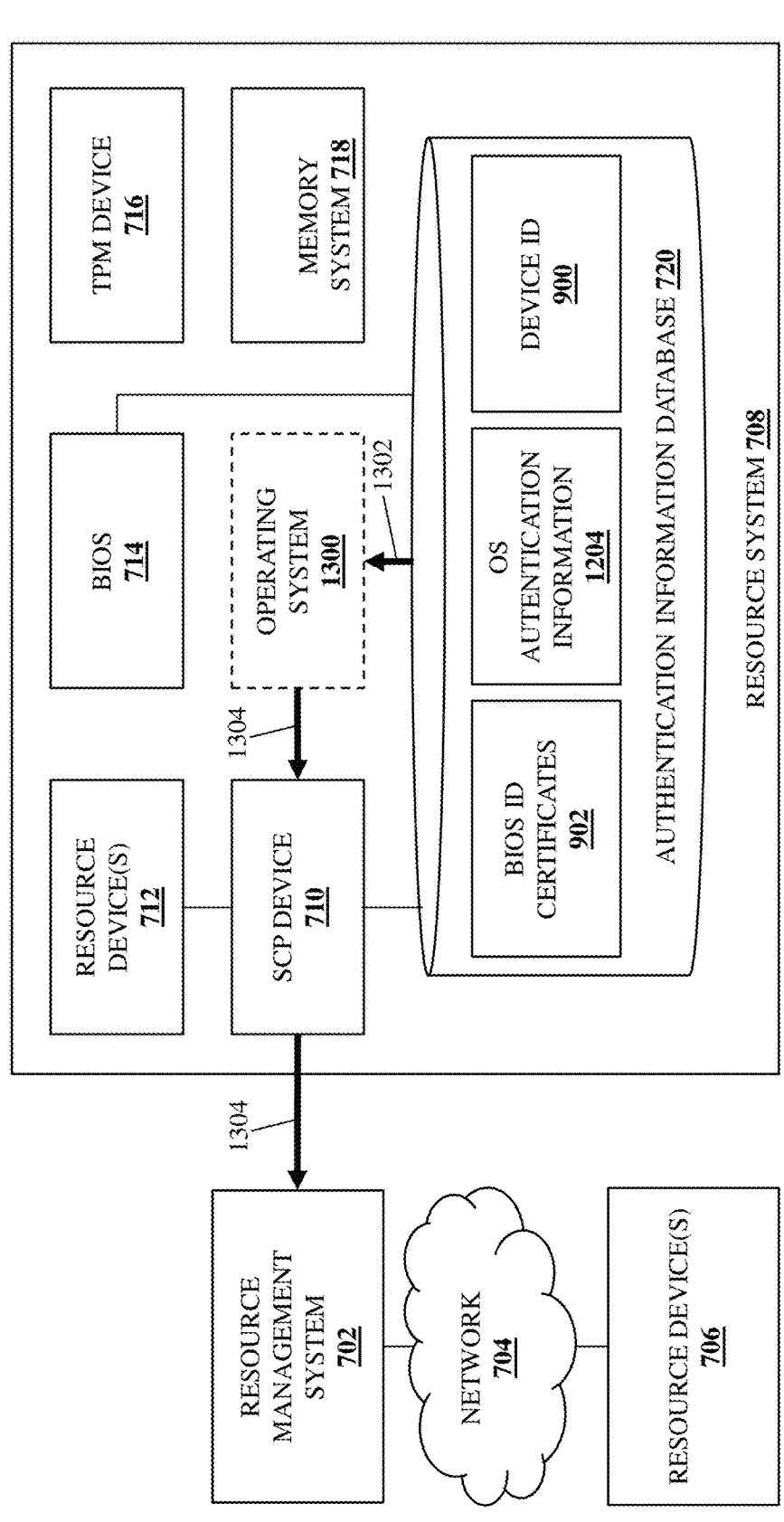
FIG. 13B is a schematic view illustrating an embodiment of the LCS provisioning system of FIG. 7 operating during the method of FIG. 8.

With reference to FIG. 13B, in an embodiment of block 810, the operating system 1300 in the resource system 708 may perform operating system configuration operations 1302 that include retrieving the device ID 900, the BIOS identity certificates 902, and the operating system authentication information 1204 and using it to configure an operating system "identity" for the operating system 1300. As will be appreciated by one of skill in the art in possession of the present disclosure, the configuration of the operating system "identity" at block 810 may include confirming the authenticity of the resource system 708 via the device identity 900, confirming the authenticity of the BIOS firmware that was run on the resource system 708 prior to the provisioning of the operating system 1300, and confirming the authenticity of the operating system software or code that was used to provide the operating system 1300 (e.g., based on the attestation of that operating system software or code by both the BIOS 714 and the resource management system 702 via the operating system authentication information 1204), with those authenticity confirmations followed by the creation by the operating system 1300 of an operating system identity certificate for the operating system 1300 that is specific to the current boot, power cycle, or other initialization of the resource system 708 (i.e., that operating system identity certificate will only be valid until the resource system 708 is powered down, and a "new" operating system identify certificate must be issued for each power cycle of the resource system 708 in order to allow the operating-system-identity-specific vTPM discussed below that is specific to that operating system identity/power cycle).

The operating system 1300 may then sign the operating system identity certificate with the operating system authentication information (i.e., the BIOS operating system authentication certificate and the resource management operating system authentication certificate discussed above) in the authentication information database 720, or have the operating system identity certificate signed via a control channel included in the LCS control plane that was authenticated at block 804 as described above, in order to provide a signed operating system authentication certificate. The operating system 1300 may then perform resource system authentication operations 1304 that include transmitting the signed operating system authentication certificate to the resource management system 702 (e.g., via the SCP device 710 in the illustrated example). As will be appreciated by one of skill in the art in possession of the present disclosure, the receipt and storage of the signed operating system authentication information by the resource management system 702 provides for the authentication of the resource system 708, confirming that the operating system 1300 "trusts" the resource system 708, and the resource system 708 "trusts" the operating system 1300.

Figure 14A:
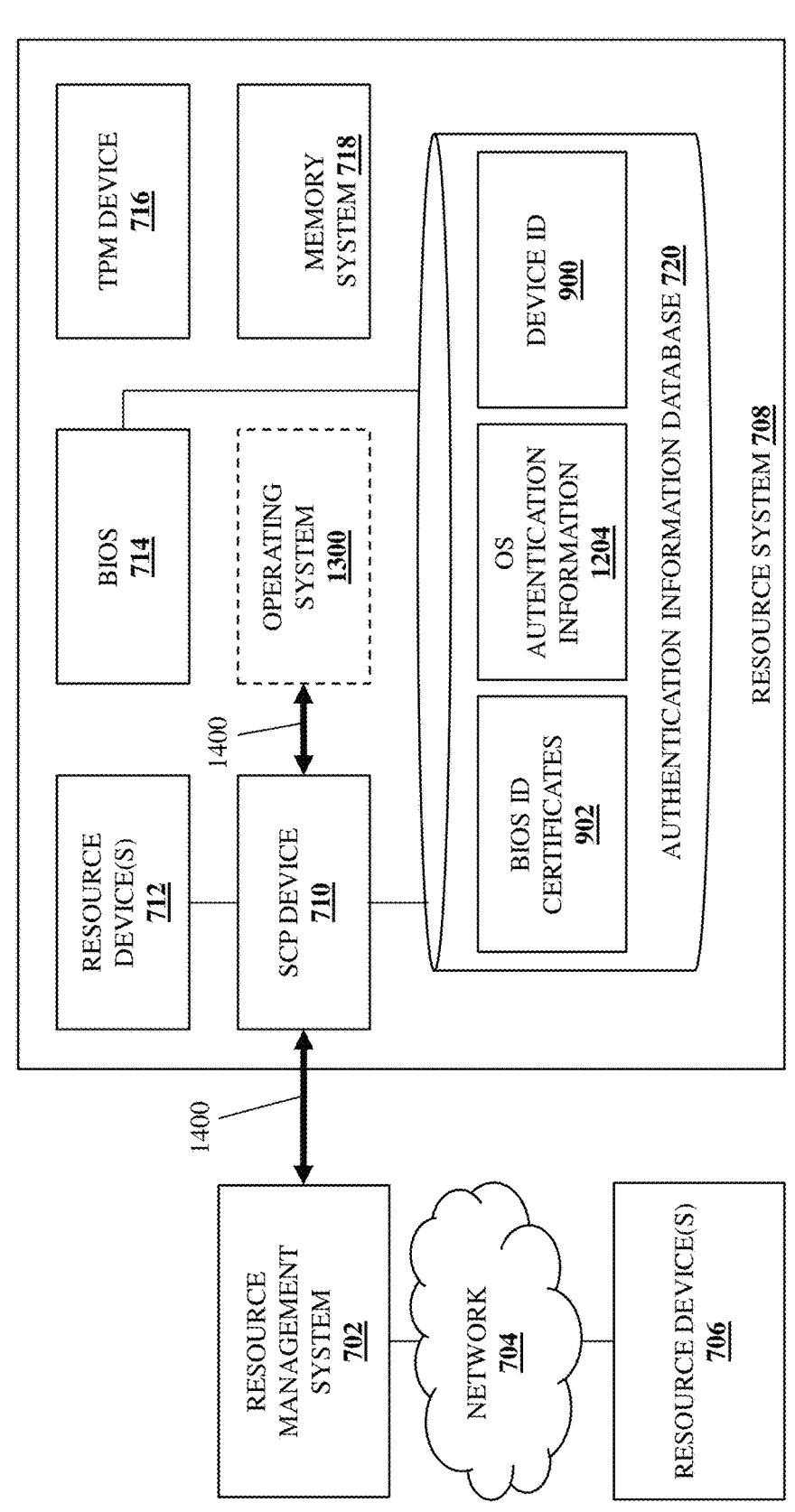
FIG. 14A is a schematic view illustrating an embodiment of the LCS provisioning system of FIG. 7 operating during the method of FIG. 8.

The method 800 then proceeds to block 812 where the operating system authenticates with the resource management system. With reference to FIG. 14A, in an embodiment of block 812, the operating system 1300 in the resource system 708 and the resource management system 702 may perform authentication operations 1400 (e.g., via the SCP device 710 in the illustrated example) that may include, for example, the operating system 1300 and the resource management system 702 using the operating system "identity" of the operating system 1300 (e.g., the operating system identity certificate discussed above) to perform mutual authentication operations. In other words, the resource management system 702 will use the operating system identity certificate that was created for the current operating system "identity" of the operating system 1300 (i.e., the "identity" of the operating system 1300 for the current power cycle/boot/initialization of the resource system 708) to perform authentication with the operating system 1300 in order to initialize a control channel (i.e., via the LCS control plane that was authenticated at block 804) with the operating system 1300 for that operating system "identity".

Figure 14B:
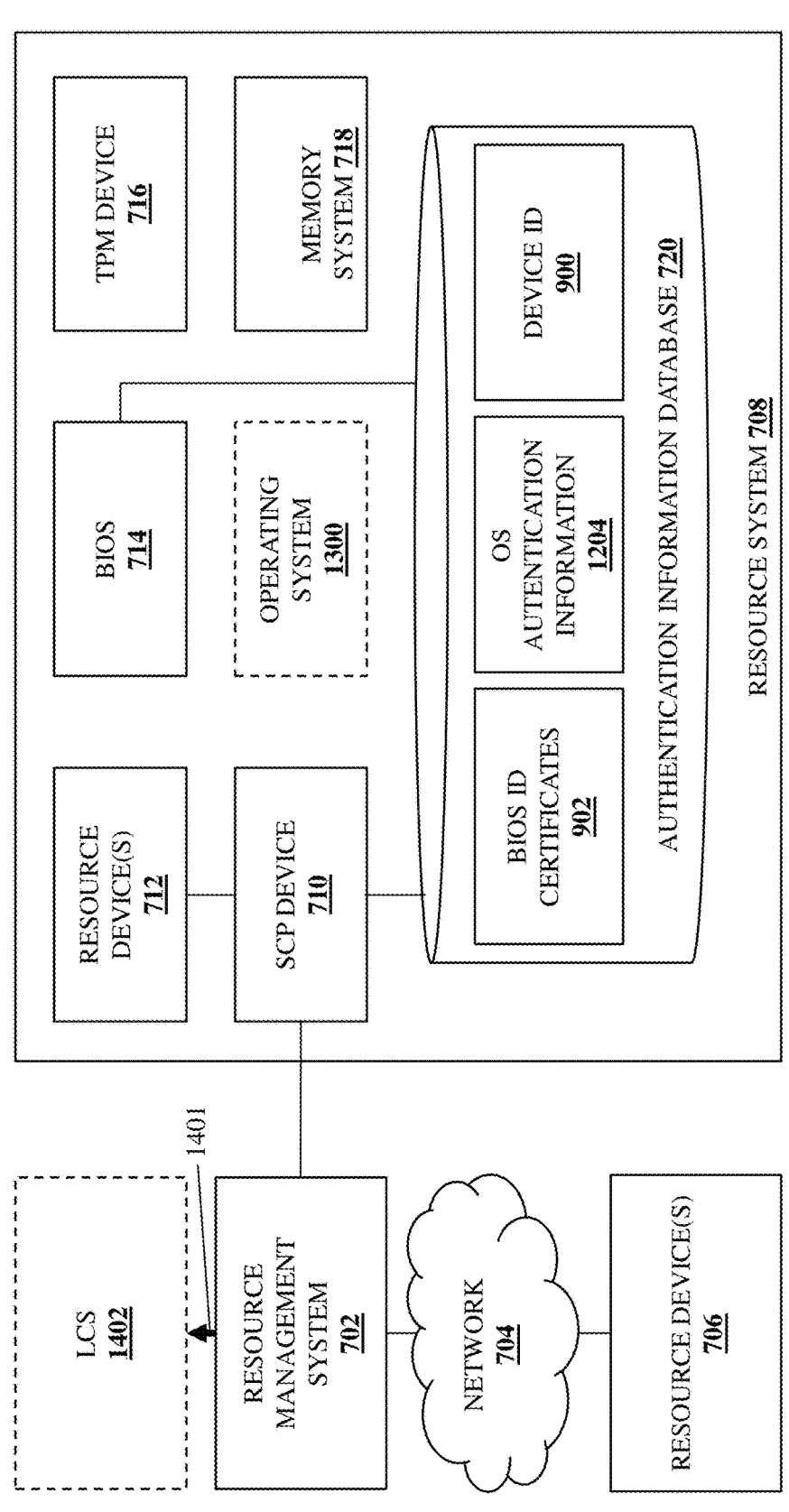
FIG. 14B is a schematic view illustrating an embodiment of the LCS provisioning system of FIG. 7 operating during the method of FIG. 8.

The method 800 then proceeds to block 813 where the resource management system composes an LCS. With reference to FIG. 14B, in an embodiment of block 813 and following the provisioning of the operating system 1300 on the resource system 708 and its authentication with the resource system 702, the resource management system 702 may perform LCS composing operations 1401 that include composing an LCS 1402 for a user in response to workload intent similarly as described above. In other words, following the authentication of the control plane between the resource management system 702 and the resource system 708, the authentication of the resource system 708, and the authentication of the operating system 1300 provided on the resource system 708, the resource management system 702 will "trust" the operating system 1300, its resource system 708, and the control plane to that resource system 708 sufficiently to compose a "trusted" LCS 1402 using that operating system 1300, resource system 708, and control plane.

Figure 15:
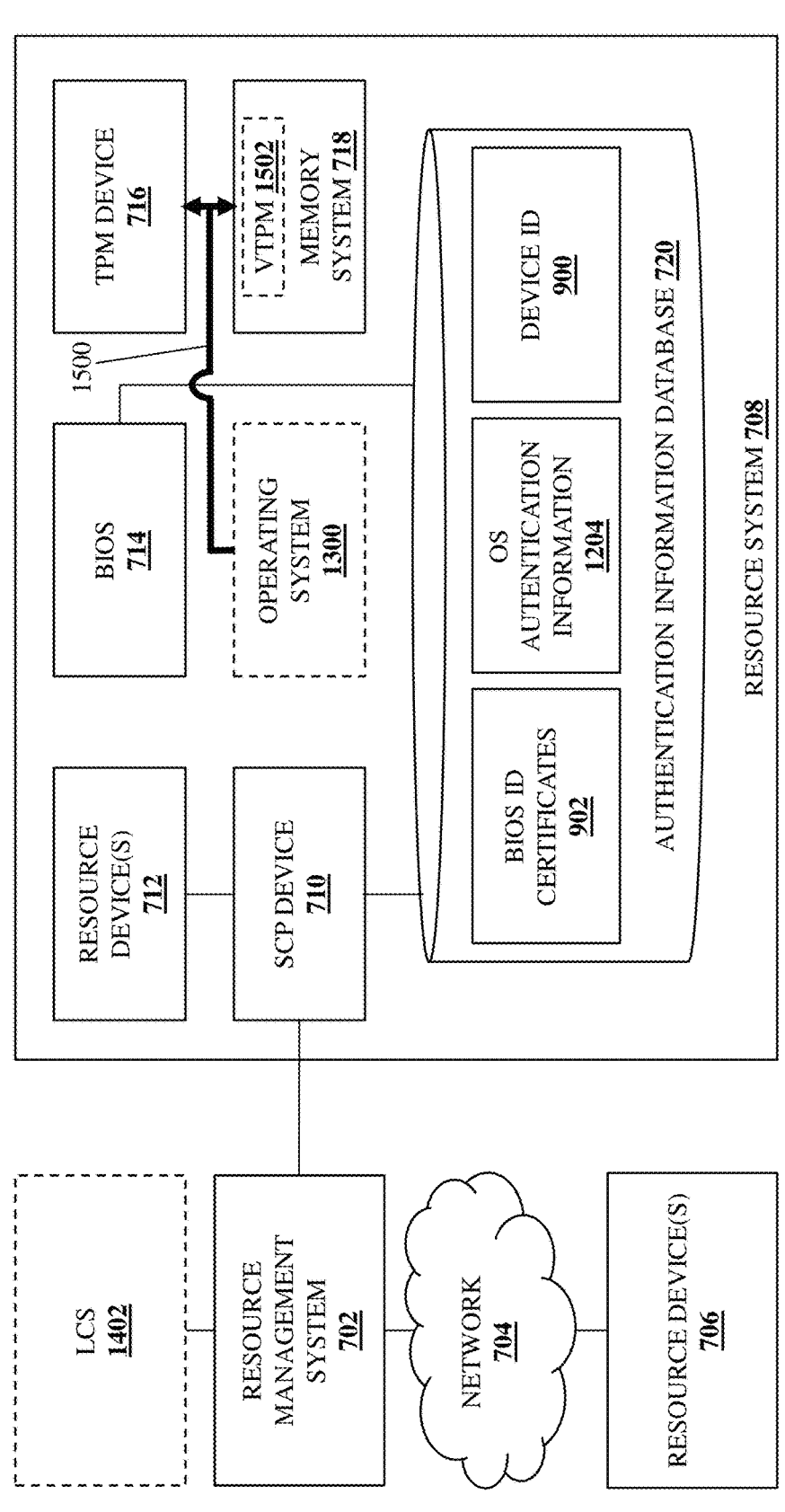
FIG. 15 is a schematic view illustrating an embodiment of the LCS provisioning system of FIG. 7 operating during the method of FIG. 8.

The method 800 then proceeds to block 814 where the operating system creates an LCS vTPM for the LCS. With reference to FIG. 15, in an embodiment of block 814, the operating system 1300 in the resource system 708 may perform vTPM creation operations 1500 that include creating a virtual Trusted Platform Module (vTPM) 1502 for the LCS 1402 in a secure space in the memory system 718, which includes generating LCS vTPM access information (e.g., an LCS vTPM public/private key pair) that one of skill in the art in possession of the present disclosure will appreciate provides an ephemeral, secure storage area in the memory system 718 that provides the vTPM 1502 for the LCS 1402, and storing that LCS vTPM access information in the TPM device 716. As discussed above, the ephemeral, secure storage area in the memory system 718 that provides the vTPM 1502 for the LCS 1402 is only valid for the operating system "identity" that is specific to the current power cycle of the resource system 708.

Figure 16:
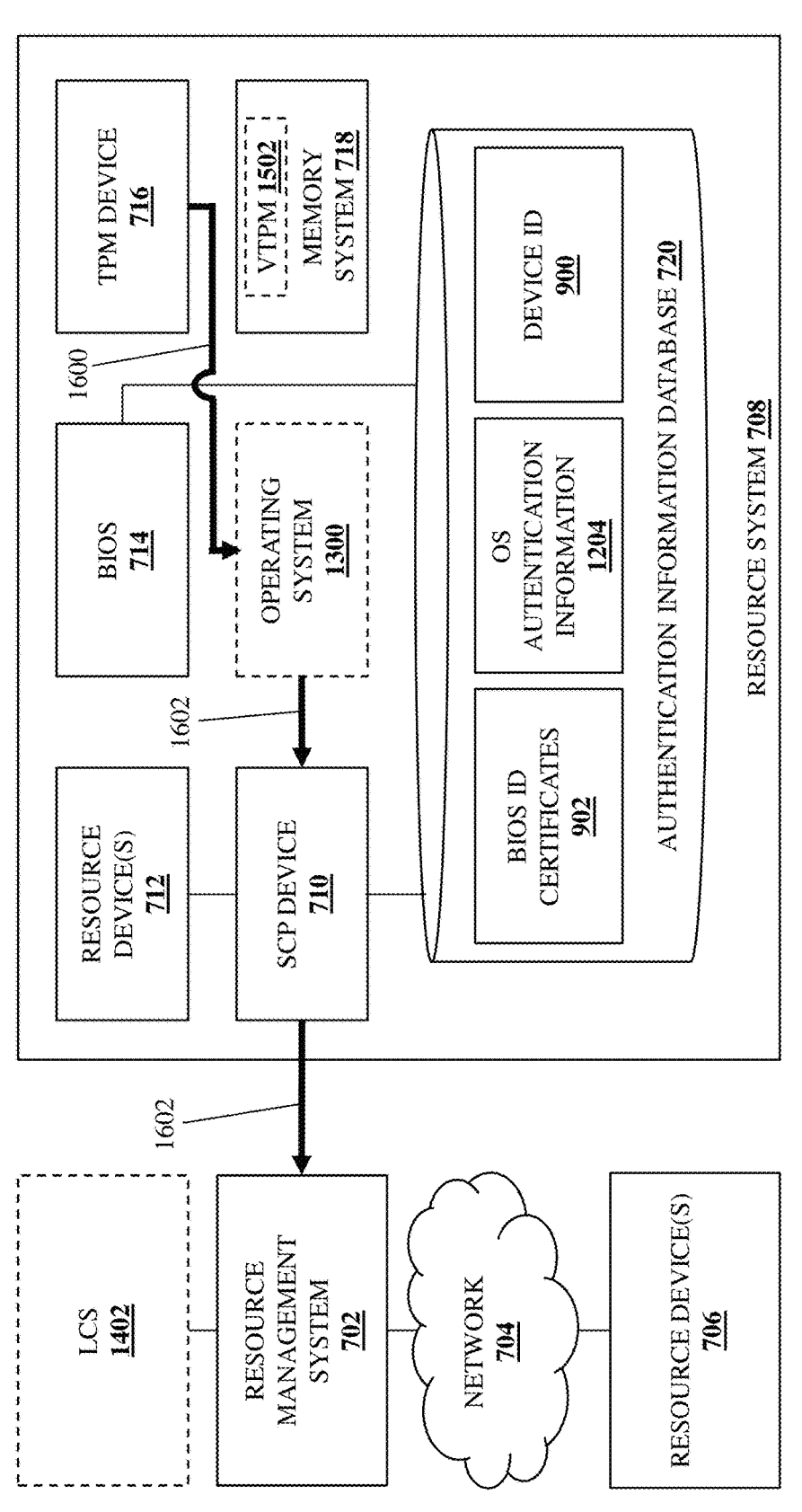
FIG. 16 is a schematic view illustrating an embodiment of the LCS provisioning system of FIG. 7 operating during the method of FIG. 8.

The method 800 then proceeds to block 816 where the operating system provides signed vTPM access information to the resource management system. With reference to FIG. 16, in an embodiment of block 816, the operating system 1300 in the resource system 708 may perform LCS vTPM access information signing operations 1600 that include retrieving some of the LCS vTPM access information (e.g., the LCS vTPM public key discussed above) from the TPM device 716, and signing that LCS vTPM access information (e.g., using the operating system identity certificate discussed above) to generate signed LCS vTPM access information. The operating system 1300 may then perform signed LCS vTPM access information provisioning operations 1602 that include providing the signed LCS vTPM access information to the resource management system 702 (e.g., via the SCP device 710 in the illustrated example), and the resource management system 702 may then store the signed LCS vTPM access information (e.g., a signed LCS vTPM public key) in a storage subsystem (e.g., an LCS vTPM storage for storing LCS vTPM access information for different LCS vTPMs provided for different LCSs composed by the resource management system 702) included in the resource management system 702.

Figure 17:
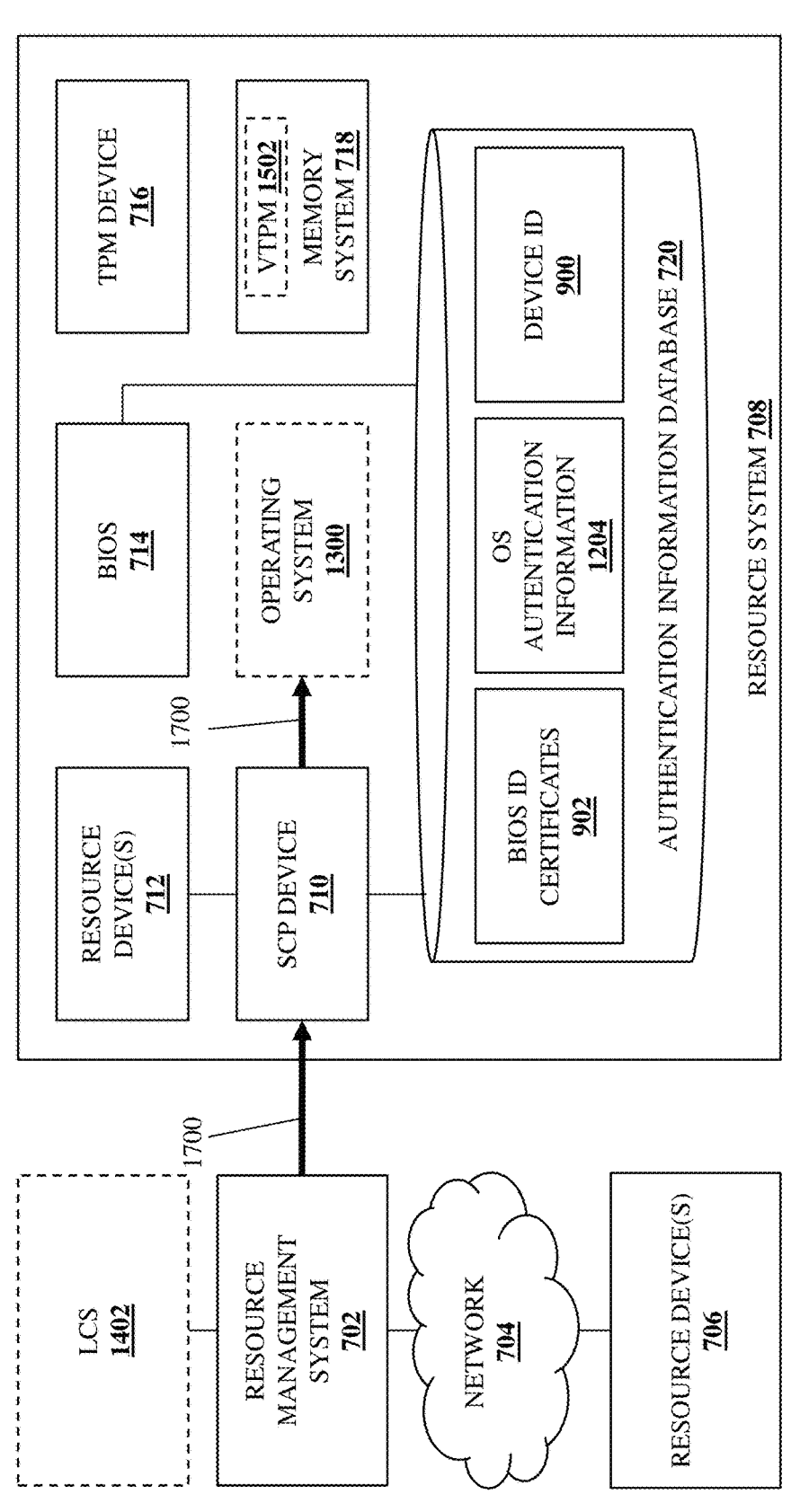
FIG. 17 is a schematic view illustrating an embodiment of the LCS provisioning system of FIG. 7 operating during the method of FIG. 8.

The method 800 then proceeds to block 818 where the resource management system provides an LCS vTPM payload to the OS. With reference to FIG. 17, in an embodiment of block 818, the resource management system 702 may perform LCS vTPM payload provisioning operations 1700 that may include the resource management system generating an LCS vTPM payload for the LCS 1402 (or retrieving the LCS vTPM payload that was generated for the LCS 1402 when it was composed at block 813), which one of skill in the art in possession of the present disclosure will appreciate may include a configuration of the features present the LCS vTPM (e.g., cryptography supported by the LCT vTPM), measurements and other register values for firmware, operating system applications, and/or other programs (or secrets used by programs) run by the LCS, and/or other LCS vTPM payload data that would be apparent to one of skill in the art in possession of the present disclosure. The resource management system 702 may then encrypt the LCS vTPM payload using the signed LCS vTPM access information (e.g., the signed LCS vTPM public key) received from the operating system 1300 at block 816, and transmit the encrypted LCS vTPM payload to the operating system 1300 (e.g., via the SCP device 710 in the illustrated example).

Figure 18:
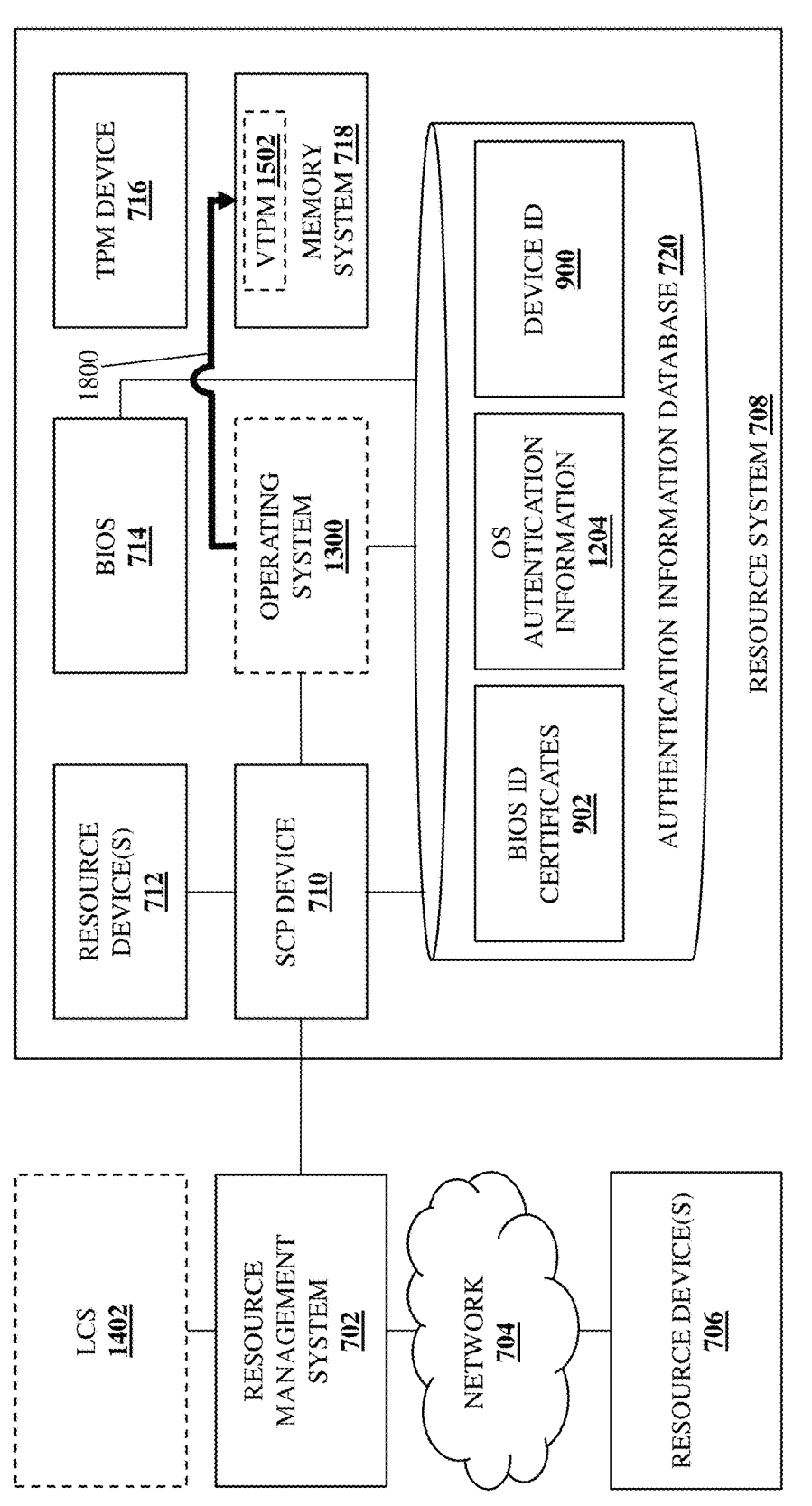
FIG. 18 is a schematic view illustrating an embodiment of the LCS provisioning system of FIG. 7 operating during the method of FIG. 8.

The method 800 then proceeds to block 820 where the operating system stores the LCS vTPM payload in the LCS vTPM. With reference to FIG. 18, in an embodiment of block 820, a service provided in secure portion of the operating system 1300 of the resource system 708 may perform LCS vTPM payload storage operations 1800 that may include decrypting the encrypted LCS vTPM payload received at block 818 (e.g., using the LCS vTPM private key stored in the TPM device 716 as described above), and storing the LCS vTPM payload in the vTPM 1502 in the memory system 718 of the resource system 708. As will be appreciated by one of skill in the art in possession of the present disclosure, the LCS vTPM payload includes the measurements and other register values for firmware, operating system applications, and/or other programs (or secrets used by programs) run by the LCS that make it specific to the LCS 1402.

Figure 19:
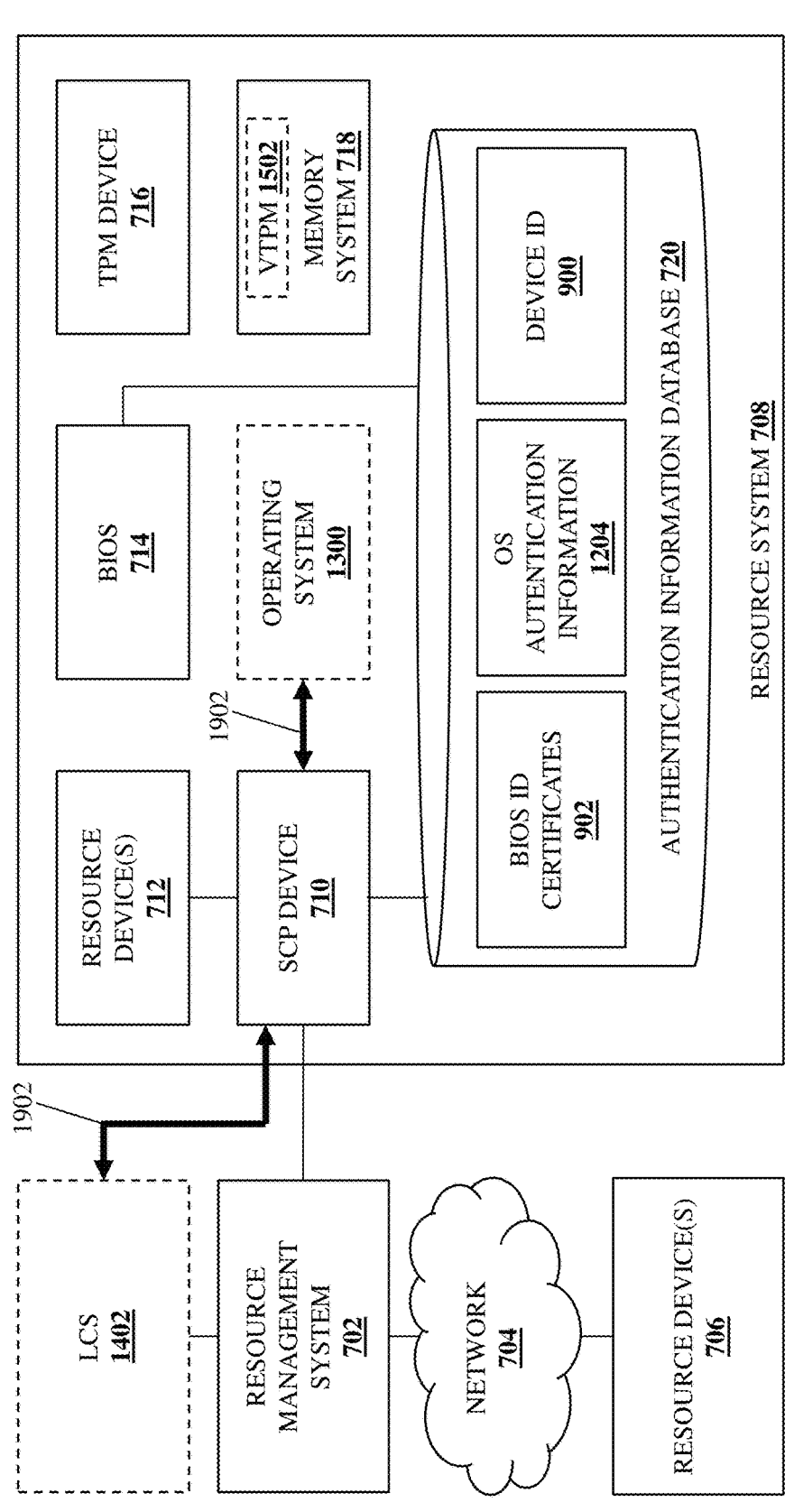
FIG. 19 is a schematic view illustrating an embodiment of the LCS provisioning system of FIG. 7 operating during the method of FIG. 8.

The method 800 then proceeds to block 822 where the operating system authenticates with an LCS provided by the resource system. With reference to FIG. 19, in an embodiment of block 822, the resource system 708 may operate with any of the resource device(s) 706 substantially as described above to provide the LCS 1402 that was composed by the resource management system 702 at block 813 as described above, and the operating system 1300 and LCS 1900 may perform mutual authentication operations 1902 (e.g., via the SCP device 710 in the illustrated embodiment) that one of skill in the art in possession of the present disclosure will appreciate will provide an authenticated LCS. For example, at block 822, the operating system 1300 may interact with a hypervisor that is being used to provide the LCS 1402 in order to validate the firmware being used to provide that hypervisor, the LCS 1402 may authenticate itself and the operating system 1300, etc.

Figure 20:
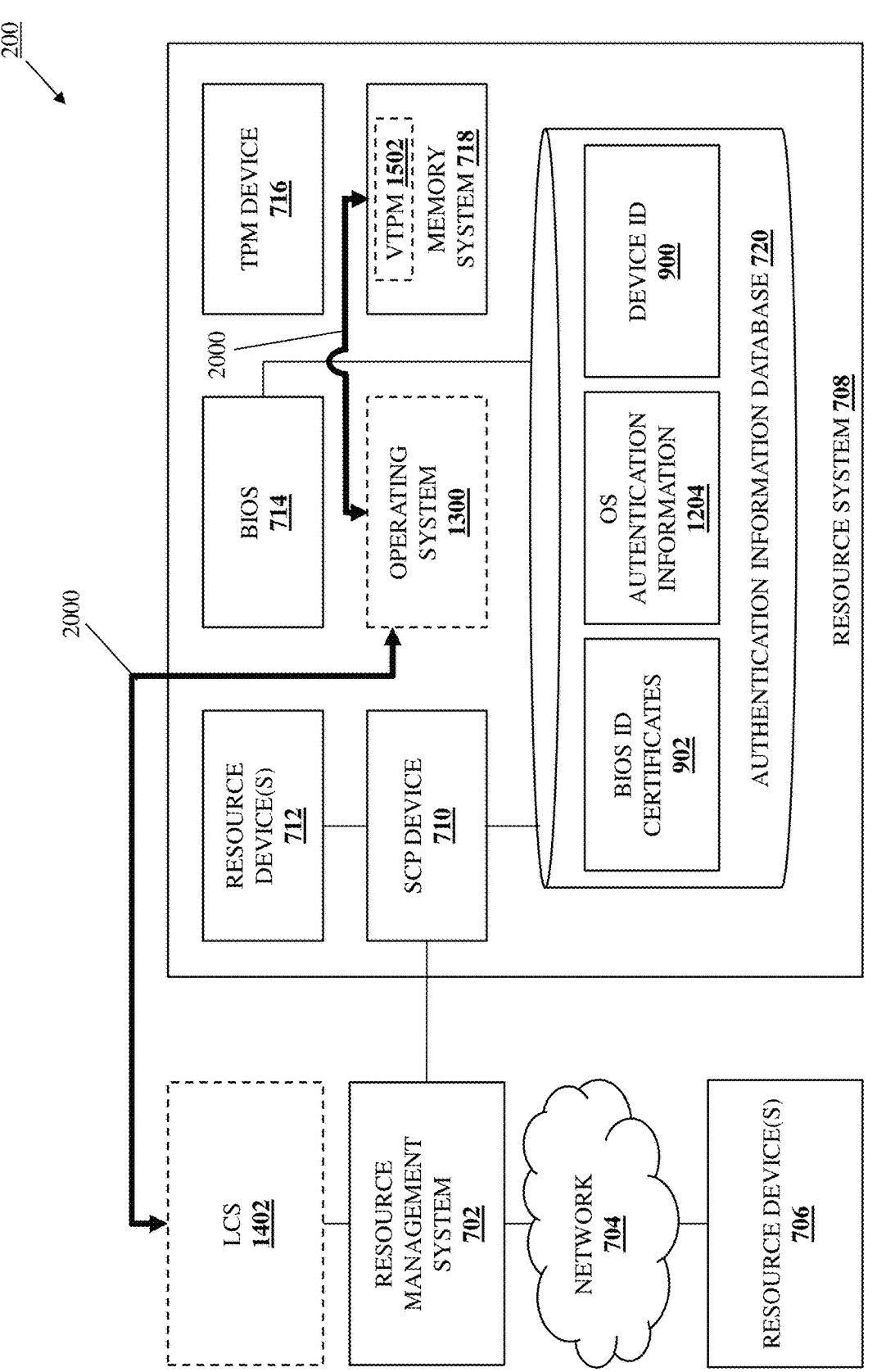
FIG. 20 is a schematic view illustrating an embodiment of the LCS provisioning system of FIG. 7 operating during the method of FIG. 8.

Following block 822, the operating system 1300 in the resource system 708 may operate to perform a workload using the authenticated LCS 1402, the authenticated resource system 708, and the authenticated control plane discussed above. Furthermore, during or as part of the performance of the workload using the LCS 1402, the LCS 1402 may access, and in some cases modify, the contents the vTPM 1502 in the memory system 718 of the resource system 708. For example, with reference to FIG. 20, the LCS 1402 may perform access and/or modification operations 2000 with the vTPM 1502 in the memory system 718 via the operating system 1300 that may include read operations (e.g., sending an LCS vTPM read request to the operating system 1300 to cause the operating system 1300 to retrieve information stored in the vTPM 1502 and provide that information to the LCS 1402) or write operations (e.g., sending an LCS vTPM write request to the operating system 1300 to cause the operating system 1300 to write information to the vTPM 1502).

Figure 21:
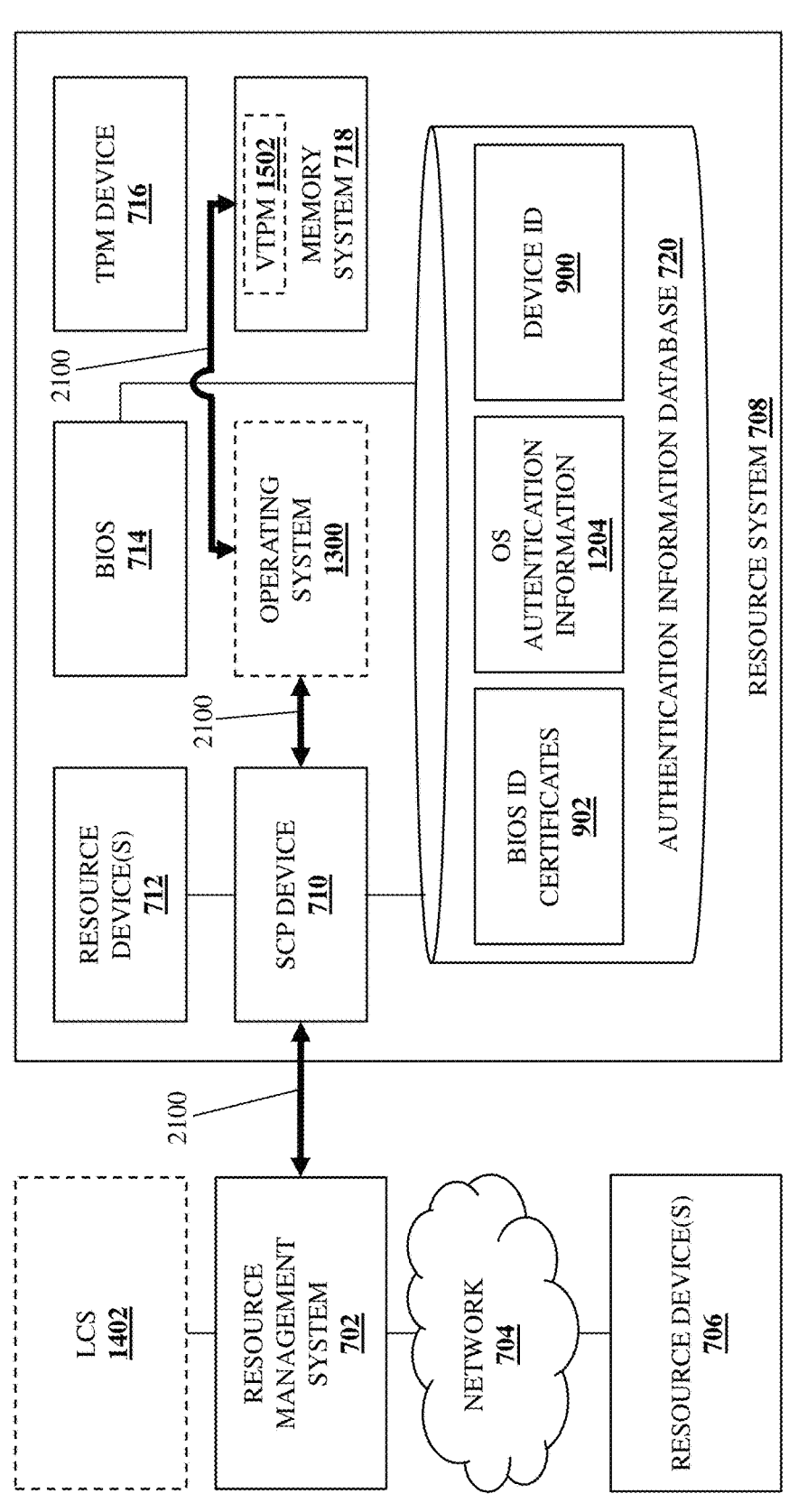
FIG. 21 is a schematic view illustrating an embodiment of the LCS provisioning system of FIG. 7 operating during the method of FIG. 8.

With reference to FIG. 21, in response to modification of the vTPM 1502 in the memory system 718 by the LCS 1402, the operating system 1300 may perform resource management system synchronization operations 2100 that may include retrieving any modifications that were made in the vTPM 1502 by the LCS 1402 (e.g., via the write operations described above) and transmitting those modifications to the resource management system 702 (e.g., via the SCP device 710 in the illustrated example), which one of skill in the art in possession of the present disclosure will appreciate provides a synchronous copy of the vTPM 1502 in the resource management system 702.

As will be appreciated by one of skill in the art in possession of the present disclosure, the synchronous copy of the vTPM 1502 in the resource management system 702 allows for secure migration of the LCS from the resource system 708 to other resource systems while maintaining the state of the LCS 1402 across those migration(s).

Thus, systems and methods have been described that provide for the authentication of a resource system and the control plane provided for the resource system, as well as between the resource system and any LCS it provides. For example, the resource/control plane/LCS authentication system of the present disclosure may include a resource system coupled to a resource management system. The resource system includes an SCP device that authenticates with the resource management system to provide an authenticated LCS control plane. An operating system in the resource system signs operating system authentication information and transmits the signed operating system authentication information to the resource management system to provide an authenticated resource system. The operating system creates an LCS vTPM for an LCS that was composed by the resource management system, and stores an LCS vTPM payload from the resource management system in the LCS vTPM. The operating system then provides the LCS using the LCS vTPM payload, with the LCS authenticating itself and the operating system to provide an authenticated LCS. The operating system then performs a workload using the authenticated LCS, the authenticated resource system, and the authenticated LCS control plane As such, the provisioning of LCSs may be authenticated both by the system providing that LCS, and by the LCS itself.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A resource/control plane/Logically Composed System (LCS) authentication system, comprising:
a resource management system; and
a resource system that is coupled to the resource management system and that includes:
a System Control Processor (SCP) device that includes at least one SCP hardware processing system that is configured to execute instructions stored on at least one SCP memory system to authenticate with the resource management system to provide an authenticated Logically Composed System (LCS) control plane;
a Basic Input/Output System (BIOS) that includes at least one BIOS hardware processing system that is configured to execute instructions stored on at least one BIOS memory system to provide BIOS operating system authentication information in an authentication information database with resource management operating system authentication information provided by the resource management system; and
an operating system that includes at least one operating system hardware processing system that is configured to execute instructions stored on at least one operating system memory system to:
sign the BIOS operating system authentication information and the resource management operating system authentication information to provide signed operating system authentication information;
transmit the signed operating system authentication information to the resource management system to provide an authenticated resource system;
create an LCS virtual Trusted Platform Module (vTPM) for an LCS that was composed by the resource management system;
receive an LCS vTPM payload for the LCS from the resource management system and store the LCS vTPM payload in the LCS vTPM;
provide the LCS using the LCS vTPM payload, wherein the LCS includes at least one LCS hardware processing system that is configured to execute instructions stored on at least one LCS memory system to authenticate itself and the operating system to provide an authenticated LCS; and
perform a workload using the authenticated LCS, the authenticated resource system, and the authenticated LCS control plane.

2. The system of claim 1, wherein the operating system includes the at least one operating system hardware processing system that is configured to execute the instructions stored on the at least one operating system memory system to:
authenticate with the resource management system using an operating system identity certificate for a current instance of the operating system being provided on the resource system during a current power cycle.

3. The system of claim 1, wherein the operating system includes the at least one operating system hardware processing system that is configured to execute the instructions stored on the at least one operating system memory system to:
generate LCS vTPM access information for the LCS vTPM; and
store the LCS vTPM access information in a Trusted Platform Module (TPM) device that is included in the resource system.

4. The system of claim 3, wherein the operating system includes the at least one operating system hardware processing system that is configured to execute the instructions stored on the at least one operating system memory system to:
sign the LCS vTPM access information to generate signed LCS vTPM access information;
transmit the signed LCS vTPM access information to the resource management system;
receive an encrypted LCS vTPM payload for the LCS that is provided by the LCS vTPM payload encrypted with the signed LCS vTPM access information;
decrypt the encrypted LCS vTPM payload to provide the LCS vTPM payload; and
store the LCS vTPM payload in the LCS vTPM.

5. The system of claim 1, wherein operating system includes the at least one operating system hardware processing system that is configured to execute the instructions stored on the at least one operating system memory system to:

receive, from the LCS, an LCS vTPM write request for the vTPM and, in response, provide write information in the LCS vTPM.

6. The system of claim 5, wherein operating system includes the at least one operating system hardware processing system that is configured to execute the instructions stored on the at least one operating system memory system to:

synchronize, with the resource management system, the write information provided in the LCS vTPM.

7. An Information Handling System (IHS), comprising:

a System Control Processor (SCP) device that includes at least one SCP hardware processing system that is configured system that is configured to execute instructions stored on at least one SCP memory system to authenticate with a resource management system to provide an authenticated Logically Composed System (LCS) control plane;

a Basic Input/Output System (BIOS) that includes at least one BIOS hardware processing system that is configured to execute instructions stored on at least one BIOS memory system to provide BIOS operating system authentication information in an authentication information database with resource management operating system authentication information provided by the resource management system; and an operating system that includes at least one operating system hardware processing system that is configured to execute instructions stored on at least one operating system memory system to:

sign the BIOS operating system authentication information and the resource management operating system authentication information to provide signed operating system authentication information;

transmit the signed operating system authentication information to the resource management system to provide an authenticated resource system;

create an LCS virtual Trusted Platform Module (vTPM) for an LCS that was composed by the resource management system;

receive an LCS vTPM payload for the LCS from the resource management system and store the LCS vTPM payload in the LCS vTPM;

provide the LCS using the LCS vTPM payload, wherein the LCS includes at least one LCS hardware processing system that is configured to execute instructions stored on at least one LCS memory system to authenticate itself and the operating system to provide an authenticated LCS; and perform a workload using the authenticated LCS, the authenticated resource system, and the authenticated LCS control plane.

8. The IHS of claim 7, wherein the operating system includes the at least one operating system hardware processing system that is configured to execute the instructions stored on the at least one operating system memory system to:

authenticate with the resource management system using an operating system identity certificate for a current instance of the operating system being provided on the resource system during a current power cycle.

9. The IHS of claim 7, wherein the operating system includes the at least one operating system hardware processing system that is configured to execute the instructions stored on the at least one operating system memory system to:

generate LCS vTPM access information for the LCS vTPM; and store the LCS vTPM access information in a Trusted Platform Module (TPM) device that is included in the resource system.

10. The IHS of claim 9, wherein the operating system includes the at least one operating system hardware processing system that is configured to execute the instructions stored on the at least one operating system memory system to:

sign the LCS vTPM access information to generate signed LCS vTPM access information;

transmit the signed LCS vTPM access information to the resource management system;

receive an encrypted LCS vTPM payload for the LCS that is provided by the LCS vTPM payload encrypted with the signed LCS vTPM access information;

decrypt the encrypted LCS vTPM payload to provide the LCS vTPM payload; and store the LCS vTPM payload in the LCS vTPM.

11. The IHS of claim 7, wherein operating system includes the at least one operating system hardware processing system that is configured to execute the instructions stored on the at least one operating system memory system to:

receive, from the LCS, an LCS vTPM read request for the vTPM and, in response, retrieve read information from the LCS vTPM and provide the read information to the LCS.

12. The IHS of claim 7, wherein operating system includes the at least one operating system hardware processing system that is configured to execute the instructions stored on the at least one operating system memory system to:

receive, from the LCS, an LCS vTPM write request for the vTPM and, in response, provide write information in the LCS vTPM.

13. The IHS of claim 12, wherein operating system includes the at least one operating system hardware processing system that is configured to execute the instructions stored on the at least one operating system memory system to:

synchronize, with the resource management system, the write information provided in the LCS vTPM.

14. A method for authenticating a Logically Composed System (LCS) along with the resource system and the LCS control plane that are used to provide that LCS, comprising:

authenticating, by a System Control Processor (SCP) device that is included in a resource system using at least one SCP processing system executing instructions stored on at least one SCP memory system, with a resource management system to provide an authenticated Logically Composed System (LCS) control plane;

providing, by a Basic Input/Output System (BIOS) that is included in the resource system using at least one BIOS processing system executing instructions stored on at least one BIOS memory system, BIOS operating system authentication information in an authentication information database with resource management operating system authentication information provided by the resource management system;

signing, by an operating system that is provided by the resource system using at least one operating system processing system executing instructions stored on at least one operating system memory system, the BIOS operating system authentication information and the resource management operating system authentication information to provide signed operating system authentication information;

transmitting, by the operating system using the at least one operating system processing system executing the instructions stored on the at least one operating system memory system, the signed operating system authentication information to the resource management system to provide an authenticated resource system;

creating, by the operating system using the at least one operating system processing system executing the instructions stored on the at least one operating system memory system, an LCS virtual Trusted Platform Module (vTPM) for an LCS that was composed by the resource management system;

receiving, by the operating system using the at least one operating system processing system executing the instructions stored on the at least one operating system memory system, an LCS vTPM payload for the LCS from the resource management system and store the LCS vTPM payload in the LCS vTPM;

providing, by the operating system using the at least one operating system processing system executing the instructions stored on the at least one operating system memory system, the LCS using the LCS vTPM payload, wherein the LCS includes at least one LCS hardware processing system that is configured to execute instructions stored on at least one LCS memory system to authenticate itself and the operating system to provide an authenticated LCS; and performing, by the operating system using the at least one operating system processing system executing the instructions stored on the at least one operating system memory system, a workload using the authenticated LCS, the authenticated resource system, and the authenticated LCS control plane.

15. The method of claim 14, further comprising:

authenticating, by the operating system using the at least one operating system processing system executing the instructions stored on the at least one operating system memory system, with the resource management system using an operating system identity certificate for a current instance of the operating system being provided on the resource system during a current power cycle.

16. The method of claim 14, further comprising:

generating, by the operating system using the at least one operating system processing system executing the instructions stored on the at least one operating system memory system, LCS vTPM access information for the LCS vTPM; and storing, by the operating system using the at least one operating system processing system executing the instructions stored on the at least one operating system memory system, the LCS vTPM access information in a Trusted Platform Module (TPM) device that is included in the resource system.

17. The method of claim 14, further comprising:

signing, by the operating system using the at least one operating system processing system executing the instructions stored on the at least one operating system memory system, the LCS vTPM access information to generate signed LCS vTPM access information;

transmitting, by the operating system using the at least one operating system processing system executing the instructions stored on the at least one operating system memory system, the signed LCS vTPM access information to the resource management system;

receiving, by the operating system using the at least one operating system processing system executing the instructions stored on the at least one operating system memory system, an encrypted LCS vTPM payload for the LCS that is provided by the LCS vTPM payload encrypted with the signed LCS vTPM access information;

decrypting, by the operating system using the at least one operating system processing system executing the instructions stored on the at least one operating system memory system, the encrypted LCS vTPM payload to provide the LCS vTPM payload; and storing, by the operating system using the at least one operating system processing system executing the instructions stored on the at least one operating system memory system, the LCS vTPM payload in the LCS vTPM.

18. The method of claim 14, further comprising:

receiving, by the operating system from the LCS using the at least one operating system processing system executing the instructions stored on the at least one operating system memory system, an LCS vTPM read request for the vTPM and, in response, retrieving read information from the LCS vTPM and providing the read information to the LCS.

19. The method of claim 14, further comprising:

receiving, by the operating system from the LCS using the at least one operating system processing system executing the instructions stored on the at least one operating system memory system, an LCS vTPM write request for the vTPM and, in response, providing write information in the LCS vTPM.

20. The method of claim 14, further comprising:

synchronizing, by the operating system with the resource management system using the at least one operating system processing system executing the instructions stored on the at least one operating system memory system, the write information provided in the LCS vTPM.

* * * * *